(12) United States Patent
Perry et al.

(10) Patent No.: US 8,940,665 B2
(45) Date of Patent: *Jan. 27, 2015

(54) OIL RELEASE WITH AMINO ACID-BASED COMPOUNDS HAVING A LONG CHAIN N-ACYL GROUP

(75) Inventors: Michael P Perry, Downingtown, PA (US); Christina S Stauffer, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 492 days.

This patent is subject to a terminal disclaimer.

(21) Appl. No.: 13/433,745

(22) Filed: Mar. 29, 2012

(65) Prior Publication Data

US 2013/0095562 A1   Apr. 18, 2013

Related U.S. Application Data

(63) Continuation-in-part of application No. 13/298,640, filed on Nov. 17, 2011, now Pat. No. 8,697,614, and a continuation-in-part of application No. 13/298,628, filed on Nov. 17, 2011.

(60) Provisional application No. 61/416,005, filed on Nov. 22, 2010, provisional application No. 61/416,031, filed on Nov. 22, 2010.

(51) Int. Cl.
*C09K 8/60* (2006.01)
*C23F 11/14* (2006.01)
(Continued)

(52) U.S. Cl.
CPC . *C09K 8/584* (2013.01); *C10G 1/00* (2013.01); *C10G 1/04* (2013.01); *C10G 1/047* (2013.01); *C10G 2300/1003* (2013.01); *C10G 2300/1011* (2013.01)
USPC ............................ 507/201; 507/244; 435/281

(58) Field of Classification Search
CPC ............ C09K 8/52; C09K 8/62; C09K 8/685; C09K 8/584; C09K 8/74; C09K 8/54
USPC .................................. 507/201, 244; 435/281
See application file for complete search history.

(56) References Cited

U.S. PATENT DOCUMENTS 3,212,575 A    10/1965  Fisher et al.
3,969,087 A    7/1976   Saito
(Continued)

FOREIGN PATENT DOCUMENTS

| CN | 1498939 A | 5/2004 |
| CN | 1566257 A | 1/2005 |
| JP | 06056636 A | 3/1994 |

OTHER PUBLICATIONS

Doong et al., Solubilization and mineralization of polycyclic aromatic hydrocarbons by pseudomonas putida in the presence of surfactant, Journal of Hazardous Materials, 2003, B96, 15-27.
(Continued)

*Primary Examiner* — Susannah Chung
*Assistant Examiner* — Atnaf Admasu

(57) ABSTRACT

Chemical compounds that are N-acyl amino acids or derivatives thereof having long chain N-acyl groups were found to have oil-releasing activity. Solutions containing these compounds may be introduced into oil reservoirs or onto oil-contaminated surface sites to release oil from oil-coated surfaces. The released oil may be recovered for further processing or waste disposal.

14 Claims, 14 Drawing Sheets

(51) Int. Cl.
*C10G 32/00* (2006.01)
*C09K 8/584* (2006.01)
*C10G 1/00* (2006.01)
*C10G 1/04* (2006.01)

(56) References Cited

U.S. PATENT DOCUMENTS

| | | |
|---|---|---|
| 4,404,109 A | 9/1983 | Tellier et al. |
| 4,686,053 A | 8/1987 | Baviere et al. |
| 5,131,921 A | 7/1992 | Sung |
| 2006/0062751 A1 | 3/2006 | Sato et al. |
| 2006/0073177 A1 | 4/2006 | Yamato |

OTHER PUBLICATIONS

Bico et al., Wetting of textured surfaces, Colloids and Surfaces A, 2002, 206, 41-46, Elsevier.

Desai et al., Microbial production of surfactants and their commercial potential, Microbiology and Molecular Biology Reviews, 1997, 61(1), 47-64, American Society for Microbiology.

Banat, Biosurfactants production and possible uses in Microbial enhanced oil recovery and oil pollution remediation: a review, Bioresource Technology, 1995, 51, 1-12, Elsevier.

Kuyukina et al., Effect of biosurfatants on crude oil desorption and mobilization in a soil system, Environmental International, 2005, 31, 155-161.

Mulligan, Environmental applications for biosurfactants, Environmental Pollution, 2005, 133, 183-198, Elsevier.

Salihu et al., An investigation for potential development on biosurfactants, Biotechnology and Molecular Biology Reviews, vol. 3 (5), 2009, 111-117, Academic Journals.

Riis et al., Influence of special surfactants on the microbial degradation of mineral oils, Chemosphere, 2000, 41, 1001-1006, Pergamon.

Sahni et al., The role of Co Solvents and Co Surfactants in making chemical floods robust, SPE International 130007, 2010.

U.S. Appl. No. 13/280,849, filed Oct. 25, 2011.

U.S. Appl. No. 13/280,972, filed Oct. 25, 2011.

U.S. Appl. No. 12/784,518.

International Search Report, Korean Patent Office, Republic of Korea, Authorized Officer Cho Ki Yun, Jul. 20, 2012.

OIL RELEASE WITH AMINO ACID-BASED COMPOUNDS HAVING A LONG CHAIN N-ACYL GROUP

This application is a continuation-in-part of U.S. National Applications Ser. Nos. 13/298,640 and 13/298,628, both filed Nov. 17, 2011, which claim priority to U.S. Provisional Applications 61/416,005 and 61/416,031, both filed Nov. 22, 2010. The entire disclosure of the above-identified applications is incorporated by reference herein.

FIELD OF INVENTION

This invention relates to the field of oil recovery from environmental locations. More specifically, oil release activity was discovered for amino acid-based chemical compounds containing a long chain N-acyl group, which indicates their use for improving oil recovery from oil-coated surfaces.

BACKGROUND

Hydrocarbons in the form of petroleum deposits and crude oil reservoirs are distributed worldwide. These oil reservoirs are measured in the hundreds of billions of recoverable barrels. Because heavy crude oil has a relatively high viscosity and may adhere to surfaces, it is essentially immobile and cannot be easily recovered by conventional primary and secondary means.

Use of surface active agents or surfactants to increase solubility of oil through reduction in surface and interfacial tensions is another technique for increasing crude oil recovery. A wide variety of surfactants identified thus far are able to significantly reduce surface and interfacial tensions at oil/water and air/water interfaces. Because surfactants partition at oil/water interfaces, they are capable of increasing the solubility and bioavailability of hydrocarbons (Desai and Banat (1997) Microbiol. Mol. Biol. Rev. 61: 47-64; Banat (1995) Bioresource Technol. 51:1-12; Kukukina et al. (2005) Environment International 31:155-161; Mulligan (2005) Environmental Pollution 133:183-198). For example, Doong and Lei ((2003) Journal of Hazardous Materials B96:15-27) found that the addition of surfactants to soil environments contaminated with polyaromatic hydrocarbons increased the mineralization rate of some hydrocarbons.

U.S. Pat. No. 4,404,109 discloses the production of microemulsions in the presence of aqueous saline solutions using a co-surfactant and a surface-active agent that is an N-acyl alpha-amino acid salt having a relatively long-chain aliphatic or alkylaryl ($C_6$ to $C_{120}$ chain) group on the central amino acid carbon and a $C_1$ to $C_{18}$ chain as part of the N-acyl group.

There remains a need for additional chemical compounds that are biodegradable and have low toxicity, which may be used to release oil from hydrocarbon coated surfaces for improving oil recovery.

SUMMARY

The method described herein provides for improved recovery of crude oil from environmental locations having oil-coated surfaces. The method makes use of a composition having one or more chemical compound that is an amino acid or derivative thereof containing a long chain N-acyl group that was found to promote the release of surface adhered crude oil.

Accordingly, the invention provides a method for improving oil recovery from oil-coated surfaces comprising:
a) providing an aqueous composition comprising at least one compound of the structure:

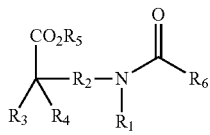

(XXIV)

where:
$R_1$ is H, $CH_3$, or is part of a heterocyclic ring (—$CH_2$—)$_n$, where n=3, 4, or 5 and the ring is directly connected to the rest of the structure at $R_4$;
$R_2$ is an alkyl group (—$CH_2$—)$_n$ where n=0 or 1; or (—$CHCH_3$—)$_n$, where n=1;
$R_3$ and $R_4$ are independently H, a straight chain alkyl or branched-chain alkyl group with 1 to 5 carbons, —$CH_2OH$, —$CH_2CH_2SCH_3$, a cycloalkyl group, a substituted cycloalkyl group, an aryl group, an alkylaryl group; a substituted aryl group; a phenyl group, —$CH_2Ph$ (Ph is phenyl), —$CH(Ph)Ph$; a heterocycle; a substituted heterocycle; or is part of a heterocyclic ring (—$CH_2$—)$_n$, where n=3, 4, or 5 and is directly connected to the rest of the structure at $R_1$;
$R_5$ is a monovalent cation or H; and
$R_6$ is a saturated alkyl chain —$(CH_2)_nCH_3$, where n is equal to or between the integers of 11 and 22, or $R_6$ is a monounsaturated alkyl chain or polyunsaturated alkyl chain containing the number of carbons equal to or between the integers of 11 and 23 and containing 1, 2 or 3 units of unsaturation; and
b) contacting an oil-coated surface with the composition of (a);
wherein oil is released from said oil-coated surface and recovered.

In another aspect the invention provides an aqueous composition comprising at least one compound of the structure of claim 1 and injection water.

BRIEF DESCRIPTION OF FIGURES

The invention can be more fully understood from the following detailed description and Figures which form a part of this application.

DETAILED DESCRIPTION

Figure 1:
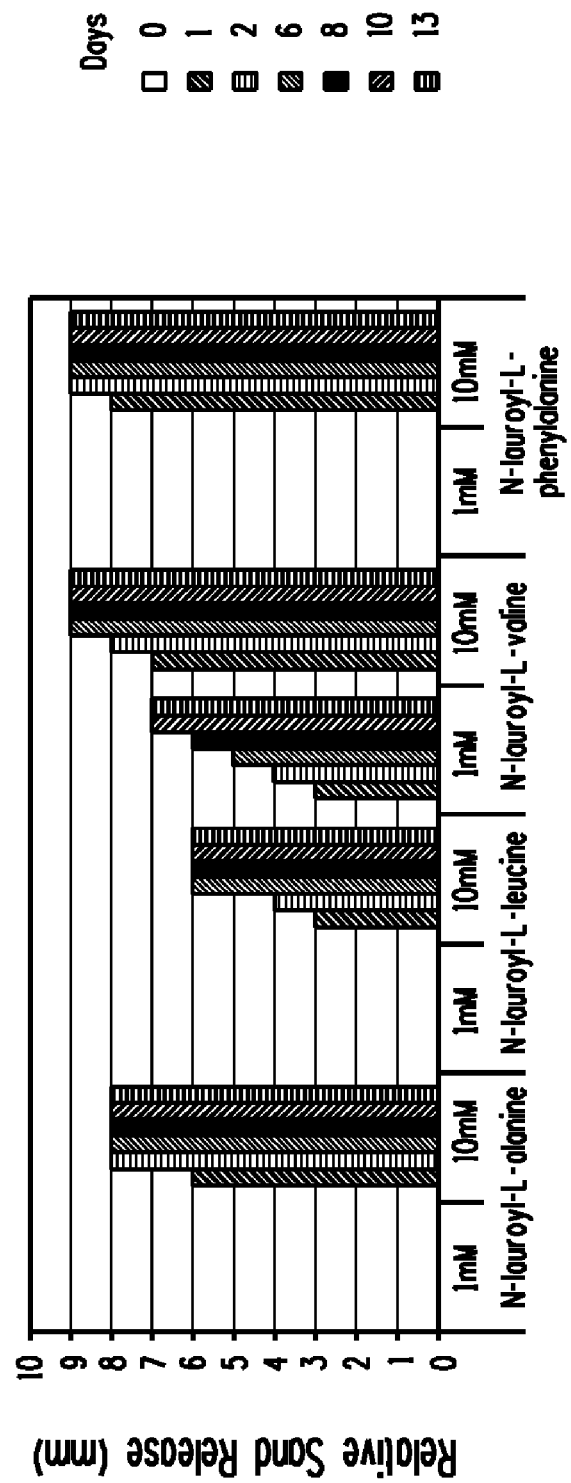
FIG. 1 shows a graph of oil release activity over time of a set of N-lauroyl amino acid compounds at 1 mM and 10 mM.

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The invention relates to methods for improving oil recovery from an environmental location by contacting oil-coated surfaces of the environment with a composition including at least one chemical compound that is an amino acid or derivative thereof containing a long chain N-acyl group. The long chain N-acyl group may increase effectiveness in the high salt environment of some oil reservoirs and remediation sites. These compounds were found to promote release of crude oil from a surface. Compositions containing one or more of these compounds may be used to contact surfaces in environmental locations such as oil reservoirs and remediation sites to promote oil release, thereby allowing recovery of the released oil.

The following definitions are provided for the special terms and abbreviations used in this application:

The abbreviation "ASTM" refers to the American Society for Testing and Materials.

The term "terrestrial subsurface formation" or "subsurface formation" refers to in ground or under ground geological formations and may comprise elements such as rock, soil, sand, shale, clays and mixtures thereof.

The term "terrestrial surface formation" or "surface formation" refers to above ground geological formations and may comprise elements such as rock, soil, sand, shale, clays and mixtures thereof.

The term "environmental site" means a site that has been contaminated with hydrocarbons, and may have other persistent environmental pollutants. Environmental sites may be in surface or subsurface locations.

"Production wells" are wells through which oil is withdrawn from an oil reservoir. An oil reservoir or oil formation is a subsurface body of rock having sufficient porosity and permeability to store and transmit oil.

The term "injection water" refers to fluid injected into oil reservoirs for secondary oil recovery. Injection water may be supplied from any suitable source, and may include, for example, sea water, brine, production water, water recovered from an underground aquifer, including those aquifers in contact with the oil, or surface water from a stream, river, pond or lake. As is known in the art, it may be necessary to remove particulate matter including dust, bits of rock or sand and corrosion by-products such as rust from the water prior to injection into the one or more well bores. Methods to remove such particulate matter include filtration, sedimentation and centrifugation.

The term "production water" means water recovered from production fluids extracted from an oil reservoir. The production fluids contain both water used in secondary oil recovery and crude oil produced from the oil reservoir.

The term "sweep efficiency" refers to the fraction of an oil-bearing stratum that has seen fluid or water passing through it to move oil to production wells. One problem that can be encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency may be due, for example, to differences in the mobility of the water versus that of the oil, and permeability variations within the reservoir which encourage flow through some portions of the reservoir and not others.

The term "irreducible water saturation" refers to the minimal water saturation that occurs in a porous core plug when flooding with oil to saturation. It represents the interstitial water content of the matrix where the water is never completely displaced by the oil because a minimal amount of water is retained to satisfy capillary forces.

The term "remediation" refers to the process used to remove hydrocarbon contaminants from an environmental site containing hydrocarbons and optionally other persistent environmental pollutants.

The term "petroleum" or "crude oil" or "oil" herein refers to a complex mixture of naturally occurring hydrocarbons of various molecular weights, with other organic compounds.

"Oil well" and "oil reservoir" may be used herein interchangeably and refer to a subsurface formation from which oil may be recovered.

"Interface" as used herein refers to the surface of contact or boundary between immiscible materials, such as oil and water or a liquid and a solid. As used herein "interfaces" includes between a water layer and an oil layer, a water layer and a solid surface layer, or an oil layer and a solid surface layer.

"Hydrocarbon-coated" or "oil-coated" as used herein refer to a coating of hydrocarbons or crude oil (also petroleum or oil) to a solid surface of at least 10% areal coverage.

"Adhered to" refers to the coating or adsorption of a liquid to a solid surface of at least 10% areal coverage.

The term "critical micelle concentration" or "CMC" refers to the concentration of a surfactant above which micelles form spontaneously.

The term "wetting" refers to the ability of a liquid to maintain contact with a solid surface, resulting from intermolecular interactions, when the two are brought together. The degree of wetting (expressed as "wettability") is determined by a force balance between adhesive and cohesive forces.

"Wetting agent" refers to a chemical such as a surfactant that increases the water wettability of a solid or porous surface by changing the hydrophobic surface into one that is more hydrophilic. Wetting agents help spread the wetting phase (e.g., water) onto the surface thereby making the surface more water wet.

"Wettability" refers to the preference of a solid to contact one liquid, known as the wetting phase, rather than another. Solid surfaces can be water wet, oil wet or intermediate wet. "Water wettability" pertains to the adhesion of water to the surface of a solid. In water-wet conditions, a thin film of water coats the solid surface, a condition that is desirable for efficient oil transport.

The term "adhesive forces" refers to the forces between a liquid and solid that cause a liquid drop to spread across the surface.

The term "cohesive forces" refers to forces within the liquid that cause a liquid drop to ball up and avoid contact with the surface.

The term "contact angle" is the angle at which a liquid (oil or water) interface meets a solid surface, such as sand or clay. Contact angle is a quantitative measurement of the wetting of a solid by a liquid and is specific for any given system, and is determined by interactions across three interfaces. The concept is illustrated with a small liquid droplet resting on a flat horizontal solid surface. The shape of the droplet is determined by the "Young Relation" (Bico et al., Colloids and Surfaces A: Physicochemical and Engineering Aspects 206 (2002) 41-46). The theoretical description of contact arises from the consideration of a thermodynamic equilibrium between the three phases: the liquid phase of the droplet (L), the solid phase of the substrate (S), and the gas/vapor phase of the ambient (V) (which will be a mixture of ambient atmosphere and an equilibrium concentration of the liquid vapor). The V phase could also be another (immiscible) liquid phase. At equilibrium, the chemical potential in the three phases should be equal. It is convenient to frame the discussion in terms of interfacial energies. The solid-vapor interfacial energy (see surface energy) is $_{SV}$, the solid-liquid interfacial energy is $_{SL}$ L and the liquid-vapor energy (i.e. the surface tension) is simply. The Young equation: $0=_{SV}-_{SL}-\cos\theta$ is written such that describes an equilibrium where $\theta_C$ is the equilibrium contact angle. In the three phase systems described herein (solid phase, hydrocarbon phase, aqueous phase), the contact angle is described as the angle through the hydrocarbon phase rather than through the aqueous phase.

Oil Release Compounds

Chemical compounds are identified herein that are effective for releasing oil from a surface. These compounds are N-lauroyl amino acid-based compounds with structure (I):

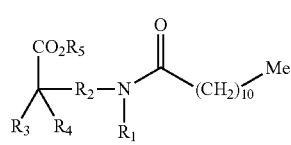

(I)

where:

$R_1$ is H, $CH_3$, or is part of a heterocyclic ring (—$CH_2$—)$_n$, where n=3, 4, or 5 and the ring is directly connected to the rest of the structure at $R_4$, such as that derived from L-proline as shown below:

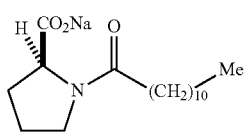

(II)

$R_2$ is an alkyl group (—$CH_2$—)$_n$ where n=0 or 1; or (—$CHCH_3$—)$_n$, where n=1;

$R_3$ and $R_4$ are independently H, a straight chain alkyl or branched-chain alkyl group with 1 to 5 carbons, —$CH_2OH$, —$CH_2CH_2SCH_3$, a cycloalkyl group, a substituted cycloalkyl group, an aryl group, an alkylaryl group; a substituted aryl group; a phenyl group, —$CH_2Ph$ (Ph is phenyl), —$CH(Ph)Ph$; a heterocycle; a substituted heterocycle; or is part of a heterocyclic ring (—$CH_2$—)$_n$, where n=3, 4, or 5 and is directly connected to the rest of the structure at $R_1$; and $R_5$ is a monovalent cation or H.

The stereochemistry of any asymmetric carbon within the N-acyl amino acid compounds of the structures given above may be either R or S, or a mixture of R and S stereoisomers. In one embodiment the N-acyl amino acid compound contains one or more stereocenters.

In one embodiment $R_3$ and $R_4$ do not have charged groups. It is desirable to maintain the compound at a pH that avoids having a charged group in the $R_3$ and $R_4$ side chains. In one embodiment $R_3$ and $R_4$ are independently a nonpolar alkyl group, an aryl group, or a polar uncharged group. In one embodiment the substituted aryl group contains substituents that are uncharged.

In one embodiment $R_3$ is H or $CH_3$.

In one embodiment $R_5$ is an alkali metal cation, such as Na$^+$ or K$^+$.

In one embodiment the total sum of the number of carbons of $R_3$ and $R_4$ are equal to or between the integers of 1 and 25.

Examples of chemical compounds of Structure (I) that may be used in the present methods include structures (III) through (XXIII) below:

N-lauroyl-L-alanine sodium salt:

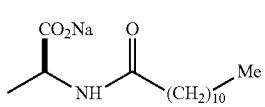

(III)

N-lauroyl-D-alanine sodium salt:

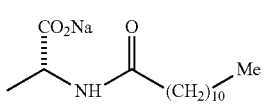

(IV)

N-lauroyl-DL-alanine sodium salt:

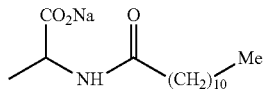
(V)

N-lauroyl-2-methylalanine sodium salt:

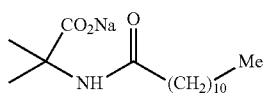
(VI)

N-lauroyl-L-leucine sodium salt:

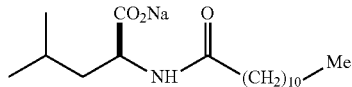
(VII)

N-lauroyl-L-isoleucine sodium salt:

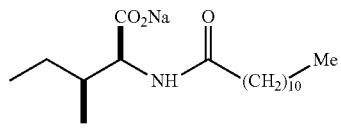
(VIII)

N-lauroyl-L-valine sodium salt:

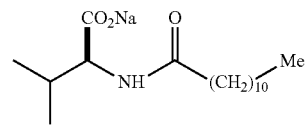
(IX)

N-lauroyl-L-tert-leucine sodium salt:

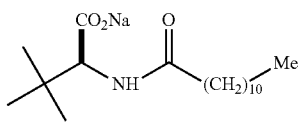
(X)

N-lauroyl-L-2-aminobutyrate sodium salt:

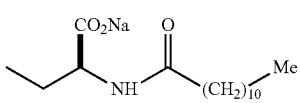
(XI)

N-lauroyl-L-norvaline sodium salt:

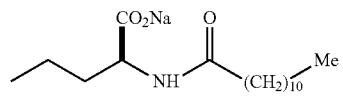
(XII)

N-lauroyl-L-methionine sodium salt:

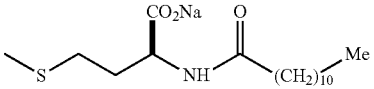
(XIII)

N-lauroyl-L-proline sodium salt:

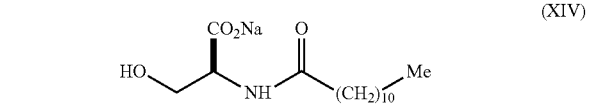
(II)

N-lauroyl-L-serine sodium salt:

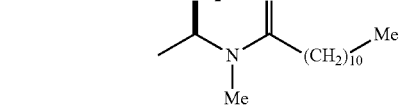
(XIV)

N-lauroyl-N-methyl-L-alanine sodium salt:

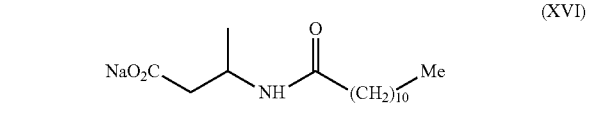
(XV)

N-lauroyl-DL-3-aminobutanoate sodium salt:

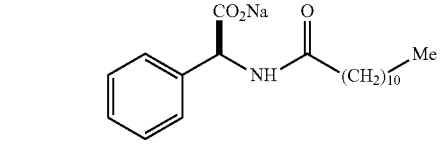
(XVI)

N-lauroyl-L-phenylglycine sodium salt:

(XVII)

N-lauroyl-L-phenylalanine sodium salt:

(XVIII)

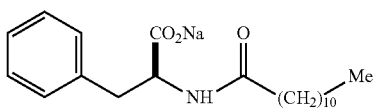

N-lauroyl-L-tryptophan sodium salt:

(XIX)

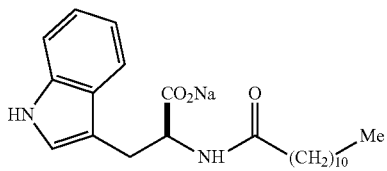

N-lauroyl-L-(4-dodecanoyloxy)-tyrosine sodium salt:

(XX)

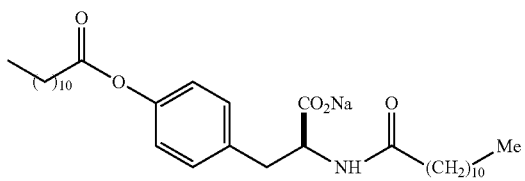

N-lauroyl-4-methyl-L-leucine sodium salt:

(XXI)

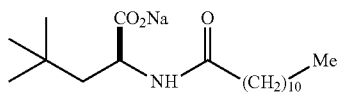

N-lauroyl-DL-3,3-diphenylalanine sodium salt:

(XXII)

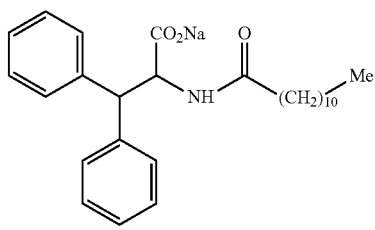

N-lauroyl-DL-3-aminoisobutyrate sodium salt:

(XXIII)

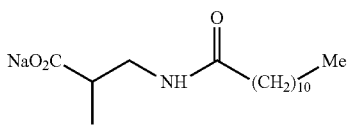

Chemical compounds of the general structure (I) may be used to release oil from a surface. As representatives of general structure (I), compounds of structures (II) through (XXIII) were shown to be active in an oil release assay. Though oil was released, increase in solubility of oil was not observed, thus indicating that an originally oil-coated surface became less oil wet and more water wet to release the oil.

Properties of the representative compound N-lauroyl-L-alanine in decreasing interfacial tension (IFT) do not suggest that this compound would have good surfactant activity. Typical good surfactants, such as surfactin, rhamnolipids, and many nonionic surfactants such as fatty alcohols, Tritons, Brij, and Tergitol would have an IFT drop of orders of magnitude in a standard interfacial tension assay such as in Example 5 herein. Such surfactants would typically be good oil solubilizers for release of oil. N-lauroyl-alanine at a concentration of 0.1% had a decrease in IFT that was less than 5-fold as compared to the medium alone control, a much smaller IFT drop than is characteristic of surfactants good for solubilizing oil.

In addition, a typical good surfactant would have a critical micelle concentration (CMC) in the M range. The CMC may be determined by the concentration where measurement of drop in surface tension levels out. This is the concentration above which micelles form spontaneously. CMCs of N-lauroyl-L-alanine, N-lauroyl-L-valine, and N-lauroyl-L-phenylalanine were measured to be between about 0.1 mM and 1 mM in a surface tension assay in Example 5 herein.

Thus, although representative compounds of the general structure (I) do not have strong surfactant properties that would provide oil solubilizing activity, these compounds were found herein to have oil release activity. The properties of these compounds are more similar to properties of wetting agents that would typically not be considered to be useful for oil release. However, altering wettability of an oil-coated surface using the present compounds, as assayed in the LOOS test described herein, was shown to provide oil release activity. Oil release obtained using the present compounds may be at least about 5%, 10%, 15%, 20%, 25%, 30%, 35% or greater of oil coated on a surface.

In different environmental conditions, use of specific compounds of structure (I) may be preferred. For example, it was found that activities of different compounds of structure (I) vary in high salts solutions. In solutions with high NaCl, $MgCl_2$, or a combination of NaCl, $MgCl_2$ and $CaCl_2$, with a salts concentration of about 5% to 6%, N-lauroyl-L-alanine (NLA) and N-lauroyl-L-valine (NLV) were active in releasing oil while N-lauroyl-L-phenylalanine (NLP) was not. Compounds of structure (I) that are most effective at the salt concentration and temperature of a specific environment can be readily determined by one of skill in the art. Temperature of production water and temperature in an oil reservoir provide information on conditions at an environmental site. One skilled in the art can readily asses the oil release activity of different compounds of structure (I) under specific environmental conditions, for example using the assay described in General Methods herein, such that compounds effective for a target environment may be chosen. Specifically, a LOOS test or alternate oil release assay is carried out under the target environmental conditions, which may include specific salinity, inclusion of specific salts, use of specific temperature, or other factors that characterize a target environment.

It is contemplated that compounds having structures similar to structure (I), but with shorter or longer carbon chains replacing $(CH_2)_{10}$, would be effective for oil release under conditions in which these compounds are soluble. Such conditions may include, for example, lower salt conditions, and/or temperatures higher than room temperature. In addition, other surfactants may be used to solubilize the shorter or longer carbon chain compounds, that are of structure (I) in other respects, in a water-based system so that they may be effective for oil release.

It is contemplated that compounds of structure (I) are biodegradable and are less toxic than typical chemical surfactants. In addition, compounds of structure (I) are able to release oil from surfaces without greatly dropping the interfacial tension between the hydrocarbons and water, so as to avoid the generation of emulsions which can be difficult to break. These characteristics of compounds of structure (I) provide benefits to their use in the environment relative to other chemical surfactants.

Additional chemical compounds are identified herein that are effective for releasing oil from a surface. These compounds are amino acid-based compounds containing a long chain N-acyl group, also called N-acyl amino acid compounds, with structure (XXIV):

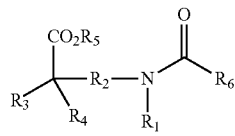

(XXIV)

where:
$R_1$ is H, $CH_3$, or is part of a heterocyclic ring $(-CH_2-)_n$, where n=3, 4, or 5 and the ring is directly connected to the rest of the structure at $R_4$, such as that derived from L-proline;
$R_2$ is an alkyl group $(-CH_2-)_n$ where n=0 or 1; or $(-CHCH_3-)_n$, where n=1;
$R_3$ and $R_4$ are independently H, a straight chain alkyl or branched-chain alkyl group with 1 to 5 carbons, $-CH_2OH$, $-CH_2CH_2SCH_3$, a cycloalkyl group, a substituted cycloalkyl group, an aryl group, an alkylaryl group; a substituted aryl group; a phenyl group, $-CH_2Ph$ (Ph is phenyl), $-CH(Ph)Ph$; a heterocycle; a substituted heterocycle; or is part of a heterocyclic ring $(-CH_2-)_n$, where n=3, 4, or 5 and is directly connected to the rest of the structure at $R_1$;
$R_5$ is a monovalent cation or H; and
$R_6$ is a saturated alkyl chain $-(CH_2)_nCH_3$, where n is equal to or between the integers of 11 and 22, or $R_6$ is a monounsaturated alkyl chain or polyunsaturated alkyl chain containing the number of carbons equal to or between the integers of 11 and 23 and containing 1, 2 or 3 units of unsaturation.

The stereochemistry of any asymmetric carbon within the N-acyl amino acid compounds of the structures given above may be either R or S, or a mixture of R and S stereoisomers. In one embodiment the N-acyl amino acid compound contains one or more stereocenters.

In one embodiment $R_3$ and $R_4$ do not have charged groups. It is desirable to maintain the compound at a pH that avoids having a charged group in the $R_3$ and $R_4$ side chains. In one embodiment $R_3$ and $R_4$ are independently a nonpolar alkyl group, an aryl group, or a polar uncharged group. In one embodiment the substituted aryl group contains substituents that are uncharged.

In one embodiment $R_3$ is H or $CH_3$.

In one embodiment $R_5$ is an alkali metal cation, such as $Na^+$ or $K^+$.

In one embodiment the total sum of the number of carbons of $R_3$ and $R_4$ are equal to or between the integers of 1 and 25.

Any compound structure shown above as (III) through (XXIII) may have $R_6$ of structure (XXIV) substituted for the $(CH_2)_{10}$-Me portion of the compound to represent a structure (XXIV) compound.

For example, structure (IX), a valine-based compound, with R6 substituted for the $(CH_2)_{10}$-Me portion of the compound is shown as:

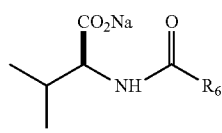

(XXV)

For example, structure (XVIII), a phenylalanine-based compound, with $R_6$ substituted for the $(CH_2)_{10}$-Me portion of the compound is shown as:

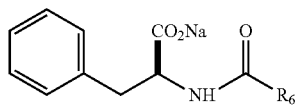

(XXVI)

As a specific structure example, structure (III) with the $(CH_2)_{10}$-Me portion of the compound substituted by the alkyl chain of oleic acid (C18:1, n-9) as $R_6$ is shown as structure (XXVII) below:
N-oleoyl-L-alanine sodium salt:

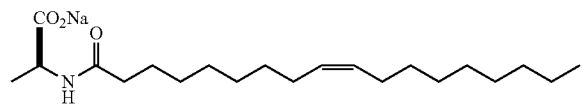

(XXVII)

The nomenclature of fatty acids gives the number of carbons:number of double bonds in the alkyl chain. The "n-" represents the position of the first double bond closest to the methyl end carbon, numbering the last (methyl) carbon as 1.

Examples of other fatty acids that may be used to provide the alkyl chain that is $R_6$ include, but are not limited to, saturated alkyl chains such as of palmitic acid (C16:0), stearic acid (C18:0), myristic acid (C14:0), heptadecanoic acid (C17:0), arachidic acid (C20:0), behenic acid (C22:0), and pentadecanoic acid (C15:0); monounsaturated alkyl chains such as of palmitoleic acid (C16:1, n-7), and eicosenoic acid (C20:1, n-9); and polyunsaturated alkyl chains such as of linoleic acid (C18:2, n-6), alpha linolenic acid (C18:3, n-3), arachidonic (20:4, n-6), stearidonic (C18:4, n-3), eicosapentaenoic acid (20:5, n-3), and docosahexaenoic acid (22:6, n-3).

Chemical compounds of the general structure (XXIV) may be used to release oil from a surface. These compounds have activity as oil releasing agents. Oil release obtained using the present compounds may be at least about 5%, 10%, 15%, 20%, 25%, 30%, 35% or greater of oil coated on a surface.

In different environmental conditions, use of specific compounds of structure (XXIV) may be preferred. Compounds of structure (XXIV) that are most effective at the salt concentration and temperature of a specific environment can be readily determined by one of skill in the art. Temperature of production water and temperature in an oil reservoir provide information on conditions at an environmental site. One skilled in the art can readily asses the oil release activity of different compounds of structure (XXIV) under specific environmental conditions, for example using the assay described in General Methods herein, such that compounds effective for a target environment may be chosen. Specifically, a LOOS test or alternate oil release assay is carried out under the target environmental conditions, which may include specific salinity, inclusion of specific salts, use of specific temperature, or other factors that characterize a target environment.

It is contemplated that compounds of structure (XXIV) are biodegradable and are less toxic than typical chemical surfactants. In addition, compounds of structure (XXIV) are able to release oil from surfaces without greatly dropping the interfacial tension between the hydrocarbons and water, so as to avoid the generation of emulsions which can be difficult to break. Further, compounds of structure (XXIV) may be effective in high calcium environments. These characteristics of compounds of structure (XXIV) provide benefits to their use in the environment for oil recovery.

Composition for Oil Release

The present composition contains one or more compounds of structure (I). In one embodiment the compound added in the composition may be the carboxylic acid form of structure (I), where $R_5$ is H. In this embodiment, the salt form of the compound is formed in the composition under conditions where the carboxylate salt can be formed, such as in the presence of carbonates, such as calcium carbonate. This may occur in the composition itself if the fluid contains salt-forming compounds, or at the location of contact with oil-coated surfaces, described below.

A compound of structure (I) may be synthesized chemically. Chemical synthesis of representative compounds of structure (I) is described in the Examples section herein using methods well-known to one skilled in the art. In addition, it is contemplated that a compound of structure (I) may be synthesized by a microorganism using an enzymatic pathway that is either native to the microorganism or genetically engineered in the microorganism. Any of these sources of compound of structure (I) may be used in the present composition.

The composition may be in any form suitable for introduction to a subsurface or surface location containing oil-coated surfaces. Typically the composition is a water-based fluid prepared using a source of water such as injection water. The concentration of the compound of structure (I) in the aqueous composition is determined by the oil release activity of the specific compound in use. For example N-lauroyl-L-phenylglycine is effective at 1 mM and may be used in this concentration, while NLA is used in 10 mM concentration. One of skill in the art can readily determine the effective concentration for the specific compound of use.

The composition may contain additional components such as other components that aid oil recovery.

In other embodiments, the present composition contains one or more compounds of structure (XXIV). In one embodiment the compound added in the composition may be the carboxylic acid form of structure (XXIV), where $R_5$ is H. In this embodiment, the salt form of the compound is formed in the composition under conditions where the carboxylate salt can be formed, such as in the presence of carbonates, such as calcium carbonate. This may occur in the composition itself if the fluid contains salt-forming compounds, or at the location of contact with oil-coated surfaces, described below.

A compound of structure (XXIV) may be synthesized chemically. Chemical synthesis of representative compounds of structure (XXIV) is described in the Examples section herein using methods well-known to one skilled in the art. Additional compounds of structure (XXIV) may be synthesized similarly using other amino acid or amino acid derivative reactants.

The compound of structure (XXIV) may be synthesized using a fatty acid that is a single species, such as oleic acid, to provide the alkyl chain of $R_6$. In this case the synthesized product is a single compound of a discrete molecular weight. In addition, the compound of structure (XXIV) may be synthesized using a mixture of fatty acids such as occurs in a natural oil. The fatty acids are typically present in an oil as triglycerides (also called triacylglycerols), which are esters of glycerol and three fatty acids. When using a mixture of fatty acids, the synthesized product is a mixture of compounds of structure (XXIV) having different $R_6$ groups that represent the different alkyl chains of fatty acids present in the fatty acid mixture used in the synthesis. The resulting mixture thus contains compounds of structure (XXIV) that have a variety of molecular weights based on the type of alkyl chain in the compound.

For example, fatty acid mixtures sourced from corn oil, canola oil, soybean oil, sunflower oil, or other available oils may be used in synthesis of compounds of structure (XXIV). These oils may be native oils. These oils may be from sources that are genetically engineered to produce a higher amount of a particular type of fatty acid than is naturally present. For example, soybean plants engineered to produce high levels of oleic acid in the seed are described in WO2008054747, which is incorporated herein by reference. Typical fatty acid composition in representative oils is given in Table 1.

TABLE 1

Major fatty acid species as % of total fatty acids in typical oils

| Fatty acid | | corn | canola | sunflower | commodity soybean | high oleic soybean* |
|---|---|---|---|---|---|---|
| Palmitic | C16:0 | 11 | 4 | 6 | 11 | 5.71-7.27 |
| Stearic | C18:0 | 2 | 2 | 4 | 4 | 0.85-8.34 |
| Oleic | C18:1 | 28 | 62 | 18 | 24 | 68.7-79.4 |
| Linoleic | C18:2 | 58 | 22 | 53 | 54 | 1.53-8.98 |
| Linolenic | C18:3 | 1 | 10 | 0.4 | 7 | 4.03-7.32 | high oleic soybean*: as described in WO2008054747

The present composition may contain a synthesis product that is a mixture of compounds of structure (XXIV) that vary in the $R_6$ position.

In addition, it is contemplated that a compound of structure (XXIV) may be synthesized by a microorganism using an enzymatic pathway that is either native to the microorganism or genetically engineered in the microorganism. Any of these sources of compound of structure (XXIV) may be used in the present composition.

The composition may be in any form suitable for introduction to a subsurface or surface location containing oil-coated surfaces. Typically the composition is a water-based fluid prepared using a source of water such as injection water. The concentration of the compound of structure (XXIV) in the aqueous composition is determined by the oil release activity of the specific compound in use. For example sodium N-oleoyl-L-alanine is effective at 10 mM and may be used in this concentration. One of skill in the art can readily determine the effective concentration for the specific compound of use.

The composition may contain additional components such as other components that aid oil recovery.

In one embodiment the present composition contains one or more compounds of structure (XXIV) and at least one microorganism which grows in the presence of oil and in the presence of an electron acceptor, and which has properties useful for improving oil recovery. The composition may be in any form suitable for introduction to an oil reservoir containing oil-coated surfaces. Typically the composition is a water-based fluid prepared using a source of water such as injection water.

Any microorganism which grows in the presence of oil and an electron acceptor, that has properties useful for improving oil recovery, may be included in the present composition. Useful microorganisms have properties such as metabolizing oil, releasing oil from surfaces, forming biofilms, and/or forming plugging biofilms. Microorganisms that may be used include, but are not limited to, species belonging to the genera: *Pseudomonas, Bacillus, Actinomycetes, Acinetobacter, Arthrobacter, Schizomycetes, Corynebacteria, Achromobacteria, Enterobacteria, Nocardia, Saccharomycetes, Schizosaccharomyces, Vibrio, Shewanella, Arcobacter, Thauera, Petrotoga, Microbulbifer, Marinobacteria, Klebsiella, Fusibacteria* and *Rhodotorula*. The present composition may include only one species, two or more species of the same genera, or species from a combination of different genera of microorganisms.

The properties of the microorganism(s) of the present composition may enhance the oil release activity of the compound of structure (XXIV) of the composition, may provide a different activity to improve oil release, or may have multiple types of activities. These microorganisms grow in the presence of oil and may use a component of oil as a carbon source. These microorganisms grow in anaerobic and/or microaerophilic conditions.

In one embodiment, one or more *Pseudomonas stutzeri* strains are included in the present composition. For example, *Pseudomonas stutzeri* strain LH4:15 (ATCC # PTA-8823) which is disclosed in US Patent Application Publication 20090263887, which has properties of growth on oil as the sole carbon source and biofilm forming activity, is included in the composition. Though strain LH4:15 did not increase oil release activity when combined with NLA in examples herein, a composition containing a compound of structure (XXIV) would benefit from biofilm forming activity of strain LH4:15 to increase oil recovery for example by increasing sweep efficiency. *Pseudomonas stutzeri* strains BR5311 (ATCC # PTA-11283) and 89AC1-2 (ATCC # PTA-11284), which form plugging biofilms (U.S. patent application Ser. No. 13/280,849, filed Oct. 25, 2011) may be included independently or in combinations.

In one embodiment a *Shewanella* sp. is included in the present composition. *Shewanella* is a bacterial genus that has been established, in part through phylogenetic classification by rDNA and is fully described in the literature (see for example Fredrickson et al., *Towards Environmental Systems Biology Of Shewanella*, Nature Reviews Microbiology (2008), 6(8), 592-603; Hau et al., *Ecology And Biotechnology Of The Genus Shewanella*, Annual Review of Microbiology (2007), 61, 237-258). For example, *Shewanella putrefaciens* strain LH4:18 which is disclosed in U.S. Pat. No. 7,776,795 and US Patent Application Publication 2011/0030956, and has properties of growth on oil as the sole carbon source and oil release activity, is included. Strain LH4:18 was shown to enhance oil release activity of NLA at low concentration. *Shewanella* sp. L3:3 (ATCC # PTA-10980) disclosed in US Patent Application Publication 2011/0030956, having oil release activity, may be included independently or in combinations with other microorganisms.

In one embodiment an *Arcobacter* species belonging to a group identified as Clade 1 is included in the present composition. In molecular phylogenetic analysis of *Arcobacter* strains, Clade 1 is a group that includes the known species *Arcobacter marinus, Arcobacter halophilus*, and *Arcobacter mytili* (U.S. patent application Ser. No. 13/280,972, filed Oct. 25, 2011). For example *Arcobacter* sp. 97AE3-12 (ATCC # PTA-11409) and/or *Arcobacter* sp. 97AE3-3 (ATCC # PTA-11410) may be included independently or in combinations. These are *Arcobacter* strains isolated from oil reservoir production water which produce plugging biofilms and belong to *Arcobacter* Clade 1.

In one embodiment *Thauera* sp. AL9:8 (ATCC # PTA-9497) is included in the present composition. *Thauera* sp. AL9:8 was isolated from subsurface soil samples and was shown to be capable of growth under denitrifying conditions using oil or oil components as the sole source of carbon. This microorganism also has oil releasing activity (U.S. Pat. No. 7,708,065).

The present composition includes components of a minimal growth medium, including one or more electron acceptors and at least one carbon source. Electron acceptors may include, for example, nitrate, fumarate, iron (III), manganese (IV), and sulfate. In one embodiment the electron acceptor is nitrate and the microorganism grows in denitrifying conditions. Nitrate is reduced to nitrite and/or to nitrogen during growth of the microorganism.

The carbon source may be a simple or a complex carbon-containing compound. The carbon source may be complex organic matter such as oil or an oil component, peptone, corn steep liquor, or yeast extract. In another embodiment the carbon source is a simple compound such as citrate, fumarate, maleate, pyruvate, succinate, acetate, or lactate.

The compositions may include additional components which promote growth of, oil release by, and/or biofilm formation by the microorganisms of the composition. These components may include, for example, vitamins, trace metals, salts, nitrogen, phosphorus, magnesium, buffering chemicals, and/or yeast extract.

The composition may contain additional components such as surfactants that aid oil recovery. In one embodiment components that promote the formation of a micro-emulsion in the composition are excluded from the present aqueous composition. In one embodiment alcohols are excluded from the present aqueous composition.

Oil-Coated Surfaces

The present method provides for releasing oil from oil-coated surfaces. Oil-coated surfaces may be any hard surface (including one or more particle) that is coated or contaminated with hydrocarbons of oil, with at least 10% areal coverage by said hydrocarbons. The hydrocarbons may be adhered to said surfaces. Hydrocarbon-coated surfaces may be in subsurface formations, for example in oil reservoirs, and may include rock, soil, sand, clays, shale, and mixtures thereof. In addition, hydrocarbon-coated surfaces may include materials that are not subsurface including rock, clay, soil, sediments, sand, sludge, harbor dredge spoils, sediments, refinery wastes, and mixtures thereof. In addition, hydrocarbon-coated surfaces may include pipelines, oil tanks, and tankers, oil handling equipment and other machinery that may be contaminated with hydrocarbons.

Treating Surface and Subsurface Formations

In the present methods, oil-coated surfaces in a surface or subsurface formation are contacted with a composition comprising at least one compound of structure (I). In other embodiments of the present methods, oil-coated surfaces in a surface or subsurface formation are contacted with a composition comprising at least one compound of structure (XXIV). Typically the subsurface formation will be contained within an oil reservoir at an oil well site, often comprising an injection well and a production well. In other embodiments the composition additionally comprises a microorganism and the composition is used to inoculate an oil reservoir leading to enhancement in oil recovery. The microorganisms in the composition include viable cells so that the microorganism inoculates the oil reservoir such that it populates and grows in the oil reservoir.

Oil-coated surfaces may be contacted using any introduction method known to one skilled in the art. To contact oil-coated surfaces in an oil reservoir, typically a fluid of the present composition is injected or pumped into a well. Injection and pumping methods are common and well known in the art, and any suitable method may be used (see for example *Nontechnical guide to petroleum geology, exploration, drilling, and production*, 2$^{nd}$ edition. N. J. Hyne, PennWell Corp. Tulsa, Okla., USA, Freethey, G. W., Naftz, D. L., Rowland, R. C., & Davis, J. A. (2002); and *Deep aquifer remediation tools*: Theory, design, and performance modeling, In: D. L. Naftz, S. J. Morrison, J. A. Davis, & C. C. Fuller (Eds.) (2002); and *Handbook of groundwater remediation using permeable reactive barriers*, D. Naftz, S. Morrison, C. Fuller, & J. Davis (Eds.) pp. 133-161, Amsterdam: Academic Press (2002)).

Injection may be through one or more injection wells, which are in communication underground with one or more production wells from which oil is recovered. The injected composition will flow into an area comprising oil-coated surfaces and fluid containing released oil is recovered at the production well. Alternatively, the present composition may be pumped down a producer well and into the formation containing oil-coated surfaces, followed by back flow of fluid containing released oil out of the producer well (huff and puff).

Contact of oil-coated surfaces in a surface formation may be by pumping the present composition onto an environmental site, and then collecting the fluid containing released oil.

Enhanced Oil Recovery

Improved oil recovery from an oil reservoir may include secondary or tertiary oil recovery of hydrocarbons from subsurface formations. Specifically, hydrocarbons are recovered that are not readily recovered from a production well by water flooding or other traditional secondary oil recovery techniques. Primary oil recovery methods, which use only the natural forces present in an oil reservoir, typically obtain only a minor portion of the original oil in the oil-bearing strata of an oil reservoir. Secondary oil recovery methods such as water flooding may be improved using the present method by promoting oil release from oil-coated surfaces by contact with a composition including at least one compound of structure (I). In addition, secondary oil recovery methods such as water flooding may be improved using the present method by promoting oil release from oil-coated surfaces by contact with a composition including at least one compound of structure (XXIV).

In addition, in some embodiments oil recovery is improved using the present method by promoting oil release from oil-coated surfaces by contact with a composition including at least one compound of structure (XXIV) and microorganisms that grow and have oil release and/or plugging biofilm formation activity. Biofilm plugging of permeable formations may reroute water used in water flooding towards less permeable, more oil rich areas. Thus enhanced oil recovery from the presence of plugging biofilms is obtained particularly from oil reservoirs where sweep efficiency is low due to, for example, interspersion in the oil-bearing stratum of rock layers that have a substantially higher permeability compared to the rest of the rock layers. The higher permeability layers will channel water and prevent water penetration to the other parts of the oil-bearing stratum. Formation of plugging biofilms by microorganisms will reduce this channeling.

The oil released from oil-coated surfaces may be recovered in production water as is the oil from primary and secondary recovery processes. This oil may be further processed by standard petroleum processing methods for commercial use.

In addition the present method may be used to improve oil recovery from surface environmental sites or equipment with hydrocarbon contamination. Oil that is not recoverable by standard methods may be released from hydrocarbon-coated surfaces for remediation of environmental sites or equipment using the present method. The released oil is recovered and may be recycled or prepared for waste disposal.

EXAMPLES

The present invention is further defined in the following Examples. It should be understood that these Examples, while indicating preferred embodiments of the invention, are given by way of illustration only. From the above discussion and these Examples, one skilled in the art may ascertain the essential characteristics of this invention, and without departing from the spirit and scope thereof, may make various changes and modifications of the invention to adapt it to various usages and conditions.

Additional Abbreviations Used in the Examples

The meaning of abbreviations is as follows: "hr" means hour(s); "mL" means milliliter(s); "° C." means degrees Celsius; "mg" means milligram(s); "mm" means millimeter(s); "g" means gram(s); "GC" means gas chromatography; "g of oil/g of total fluid" means gram of oil per gram of total fluid; "ppm" means parts per million; "mM" means millimolar; "M" means molar; "%" means percent; "min" means minute(s); "mL/min means milliliter per minute;" g/L" means microgram per liter; "nM" means nanomolar; "M" means micromolar, "mg/mmol" means milligrams per millimole; "Et$_3$N" means triethylamine, "Et$_2$O" means diethyl ether, "EtOAc" means ethyl acetate, "NLA" means N-lauroyl-L-alanine, "SIB" means simulated injection brine, "MHz" means megahertz, "Hz" means hertz; "δ" means parts per million, "t" means triplet, "H" means protons, "m" means multiplet, "J" means coupling constant, "q" means quartet, "mN/m" means milliNewton per meter, "OD" means outer diameter; r.t. is room temperature.

General Methods

Unless otherwise stated, the amino acids and other reagents were purchased from Sigma-Aldrich (St. Louis, Mo.). Acetone, NaOH and K$_2$CO$_3$ were purchased from EMD Chemicals (Gibbstown, N.J.). L-methionine, L-tyrosine, 2-methylalanine and 3-aminobutanoic acid were purchased from Acros Organics (Morris Plains, N.J.). L-phenylglycine, L-tert-leucine, L-norvaline and L-2-aminobutyric acid were purchased from Alfa Aesar (Ward Hill, Mass.). N-lauroyl-L-serine was purchased from Wilshire Technologies (Princeton, N.J.).

Commodity soybean oil was obtained from Spectrum (Petaluma, Calif.). The fatty acid composition of this oil is (liven in Table 2.

TABLE 2

Major fatty acid species as % of total fatty acids in commodity soybean oil from Spectrum

| alkyl chain | fatty acid | % |
|---|---|---|
| C16:0 | Palmitic | 8 to 13.5 |
| C18:0 | Stearic | 3 to 5 |
| C18:1, n-9 | Oleic | 18 to 28 |
| C18:2, n-3 | Linoleic | 48 to 57 |
| C18:3, n-6 | Linolenic | 5 to 11 |

High oleic soybean oil came from Plenish™ soybeans (Pioneer Hi-Bred, Johnston, Iowa). The fatty acid composition of this oil as reported in WO2008054747, which is incorporated herein by reference, is given in Table 3.

TABLE 3

Major fatty acid species as % of total fatty acids in oil from Plenish ™ soybeans

| alkyl chain | fatty acid | % |
|---|---|---|
| C14:0 | Myristic | 0.04-0.05 |
| C16:0 | Palmitic | 5.71-7.27 |
| C16:1, n-7 | Palmitoleic | 0.08-0.11 |
| C17:0 | Heptadecanoic | 0.70-0.89 |
| C17:1, n-7 | Heptadecenoic | 1.01-1.51 |
| C18:0 | Stearic | 0.85-8.34 |
| C18:1, n-9 | Oleic | 68.7-79.4 |
| C18:2, n-6 | Linoleic | 1.53-8.98 |
| C18:3, n3 | Linolenic | 4.03-7.32 |
| C20:0 | Arachidic | 0.39-0.53 |
| C20:1, n-9 | Eicosenoic | 0.29-0.39 |
| C22:0 | Behenic | 0.38-0.55 |
| C24:0 | Lignoceric | 0.12-0.17 |

Synthesis of N-Lauroyl Amino Acids
General Method for Acylation:

A round bottom flask was charged with an amino acid (1.0 equiv.) and $K_2CO_3$ (430 mg/mmol) and dissolved in water. The solution was cooled to 0° C. A solution of lauroyl chloride (1.0 equiv.) in acetone was added dropwise to the cooled solution. After addition was complete, the reaction mixture was allowed to warm up to room temperature over the course of 3 hours. Most of the acetone was then removed under reduced pressure and the remaining solution was acidified with concentrated HCl to pH=1. The white precipitate that formed was collected using vacuum filtration, washed with $H_2O$ 3×, and dried. If a precipitate was not observed, then the acidified aqueous layer was extracted using EtOAc or $Et_2O$ (3×), the combined organic layers were washed with brine, and the sample was dried over anhydrous $Na_2SO_4$. The solvent was removed under reduced pressure to provide the crude product.

Purification Method 1:

The residue was purified by flash column chromatography (4:1 EtOAc/hex→→10% MeOH/CHCl$_3$; monitored by TLC using bromocresol green) to provide the product.

Purification Method 2:

The crude product was recrystallized twice from hot toluene.

Synthesis of N-lauroyl Amino Acid Sodium Salts

The N-lauroyl amino acid (1.0 equiv.) was dissolved in ethanol. Sodium hydroxide (1.0 equiv., dissolved in ethanol) was added to the solution. The reaction mixture was allowed to stir at least 30 minutes. The ethanol was removed under reduced pressure and the product was washed with hexane (3×) to remove any residual traces of ethanol.

N-lauroyl-L-alanine (NLA) Sodium Salt: The acid was prepared as described in General Method for Acylation with L-alanine as the amino acid, and the resulting product was a white solid (5.17 g, 85%). The sodium salt was prepared as described above and yielded 5.17 g (78% over 2 steps). $^1$H NMR (400 MHz, $D_2O$) δ 0.97 (t, J=6.4 Hz, 3H), 1.35-1.44 (m, 19H), 1.69 (m, 2H), 2.35 (t, J=7.5 Hz, 2H), 2.24 (q, J=7.2 & 14.4 Hz, 1H).

N-lauroyl-L-leucine Sodium Salt: The acid was prepared as described in General Method for Acylation with L-leucine as the amino acid, and the resulting product was a white solid (3.82 g, 80%). The sodium salt was prepared as described above and yielded 3.74 g (73% over 2 steps). $^1$H NMR (400 MHz, $D_2O$) δ 0.86 (t, J=7.3 Hz, 3H), 0.92 (d, J=5.8 Hz, 3H), 0.95 (d, J=5.8 Hz, 3H), 1.28 (br s, 16H), 1.65 (m, 5H), 2.30 (m, 2H), 4.23 (m, 1H).

N-lauroyl-L-valine (NLV) Sodium Salt: The acid was prepared as described in General Method for Acylation with L-valine as the amino acid, and the resulting product was a white solid (4.56 g, 89%). The sodium salt was prepared as described above and yielded 4.9 g (77% over 2 steps). $^1$H NMR (400 MHz, $D_2O$) δ 0.85-0.90 (m, 6H), 0.94 (d, J=6.8 Hz, 3H), 1.28 (br s, 16H), 1.63 (m, 2H), 2.19 (m, 1H), 2.26-2.40 (m, 2H), 4.16 (d, J=5.1 Hz, 1H).

N-lauroyl-L-phenylalanine (NLP) Sodium Salt: The acid was prepared as described in General Method for Acylation with L-phenylalanine as the amino acid, and the resulting product was a white solid (3.76 g, 90%). The sodium salt was prepared as described above and yielded 4.0 g (83% over 2 steps). $^1$H NMR (400 MHz, $D_2O$) δ 0.82-1.51 (m, 21H), 2.04 (t, J=6.3 Hz, 2H), 2.81 (dd, J=9.5 & 13.7 Hz, 1H), 3.19 (dd, J=3.2 & 14.7 Hz, 1H), 4.45 (dd, J=4.1 & 9.8 Hz, 1H), 7.01 (t, J=7.7 Hz, 1H), 7.10-7.17 (m, 4H).

N-lauroyl-N-methyl-L-alanine Sodium Salt: N-methyl-L-alanine (1.0 g, 9.7 mmol) was charged into a 250 mL round bottom flask under $N_2$ and dissolved in anhydrous DMF (20 mL), followed by addition of $Et_3N$ (1.48 mL, 10.7 mmol). The reaction was cooled to 0° C. and lauroyl chloride (2.2 mL, 9.7 mmol) was added dropwise via syringe. The reaction was allowed to come to room temperature and stirred for 5 hours. Upon completion, the reaction was quenched by addition of $H_2O$ (30 mL) and the pH was adjusted with concentrated HCl until pH=3. The aqueous layer was extracted with $Et_2O$ (5×). The combined organic layers were washed with brine, dried over anhydrous $Na_2SO_4$, and concentrated under reduced pressure. The residue was purified by flash column chromatography (7:3 EtOAc/hex→10% MeOH/$CH_2Cl_2$), followed by recrystallization from hexane to provide the acid (0.25 g, 9%). The sodium salt was prepared as described above and yielded 0.25 g (9% over 2 steps). $^1$H NMR (400 MHz, $D_2O$; mixture of rotamers) δ 0.97 (t, J=6.0 Hz, 3H), 1.31-1.50 (m, 19H), 1.68 (br s, 2H), 2.39-2.61 (m, 2H), 2.86 and 3.04 (2s, 3H), 4.51 and 4.99 (2q, J=8.0 & 14.0 Hz, 1H).

N-lauroyl-L-serine Sodium Salt: N-lauroyl-L-serine was purchased from Wilshire Technologies (Princeton, N.J.). The sodium salt was prepared as described above and yielded 0.47 g (93%). $^1$H NMR (400 MHz, $D_2O$) δ 0.88 (br t, J=6.6 Hz, 3H), 1.29 (br s, 16H), 1.61 (m, 2H), 2.31 (t, J=8.1 Hz, 2H), 3.77-3.88 (m, 2H), 4.26 (t, J=4.4 Hz, 1H).

N-lauroyl-DL-alanine Sodium Salt: The acid was prepared as described in General Method for Acylation DL-alanine as the amino acid, and purified as described in Purification Method 1 to provide the product as a white solid (4.08 g, 67%). The sodium salt was prepared as described above and yielded 4.41 g (67% over 2 steps). $^1$H NMR (400 MHz, $D_2O$) δ 0.88 (t, J=6.8 Hz, 3H), 1.23-1.36 (m, 19H), 1.62 (m, 2H), 2.27 (t, J=8.0 Hz, 2H), 4.17 (q, J=8.0 & 14.8 Hz, 1H).

N-lauroyl-D-alanine Sodium Salt: N-lauroyl-D-alanine was prepared using General Method for Acylation with D-alanine as the amino acid, and Purification Method 1 (white solid, 1.42 g, 54%). The salt was prepared as described (1.28 g, 44% over 2 steps). $^1$H NMR (400 MHz, D$_2$O) δ 0.95 (t, J=6.9 Hz, 3H), 1.30-1.44 (m, 19H), 1.68 (m, 2H), 2.30 (t, J=8.1 Hz, 2H), 4.23 (q, J=6.3 & 14.4 Hz, 1H).

N-lauroyl-L-proline Sodium Salt: N-lauroyl-L-proline was prepared using General Method for Acylation with L-proline as the amino acid, and Purification Method 1 (white solid, 1.52 g, 59%). The salt was prepared as described (1.50 g, 52% over 2 steps). $^1$H NMR (400 MHz, D$_2$O, mixture of rotamers) δ 0.93-1.00 (m, 3H), 1.37 (br s, 16H), 1.67 (m, 2H), 1.91-2.50 (m, 6H), 3.53 (m, 1H), 3.62 and 3.79 (2m, 1H), 4.33 and 4.36 (2dd, J=3.4 & 8.4 Hz, 1H).

N-lauroyl-L-tryptophan Sodium Salt: N-lauroyl-L-tryptophan was prepared using General Method for Acylation with L-tryptophan as the amino acid, and Purification Method 1 (off-white solid, 1.05 g, 56%). The salt was prepared as described (1.11 g, 56% over 2 steps). $^1$H NMR (400 MHz, D$_2$O) δ 0.60-1.45 (m, 21H), 1.59 (m, 1H), 1.68 (m, 1H), 3.00 (br s, 2H), 4.40 (t, J=5.4 Hz, 1H), 6.80 (m, 2H), 6.89-6.96 (m, 2H), 7.25 (d, J=6.9 Hz, 1H).

N-lauroyl-L-isoleucine Sodium Salt: N-lauroyl-L-isoleucine was prepared using General Method for Acylation with L-isoleucine as the amino acid, and Purification Method 1 (white solid, 1.40 g, 59%). The salt was prepared as described above (white solid, 1.50 g, 59% over 2 steps). $^1$H NMR (400 MHz, D$_2$O) δ 0.75-0.90 (m, 9H), 1.08 (m, 1H), 1.21 (br s, 16H), 1.38 (m, 1H) 1.47-1.65 (m, 2H), 1.86 (m, 1H), 2.18-2.34 (m, 2H), 4.12 (d, J=5.60 Hz, 1H).

N-lauroyl-L-methionine Sodium Salt: N-lauroyl-L-methionine was prepared using General Method for Acylation with L-methionine as the amino acid, and Purification Method 1 (white solid, 1.19 g, 54%). The salt was prepared as described above (white solid, 0.65 g, 27% over 2 steps). $^1$H NMR (400 MHz, D$_2$O) δ 0.81 (t, J=7.1 Hz, 3H), 1.22 (br s, 16H), 1.56 (m, 2H), 1.90 (m, 1H), 2.02-2.12 (m, 4H), 2.21-2.31 (m, 2H), 2.40-2.54 (m, 2H), 4.25 (dd, J=4.0 & 9.0 Hz, 1H).

N-lauroyl-L-(4-dodecanoyloxy)-tyrosine Sodium Salt: N-lauroyl-L-(4-dodecanoyloxy)-tyrosine was prepared using General Method for Acylation with L-tyrosine as the amino acid, and Purification Method 1 (white solid, 0.44 g, 15%). The salt was prepared as described (white solid, 0.23 g, 7.4% over 2 steps). $^1$H NMR (400 MHz, CD$_3$OD) δ 0.90 (t, J=7.1 Hz, 6H), 1.29 (m, 28H), 1.47-1.55 (m, 2H), 1.56-1.63 (m, 2H), 2.13 (t, J=7.6 Hz, 2H), 2.30 (t, J=7.4 Hz, 2H), 2.87 (dd, J=7.3 & 13.8 Hz, 1H), 3.10 (dd, J=4.9 & 13.9 Hz, 1H), 4.47 (q, J=4.8 & 7.2 Hz, 1H), 6.64 (d, J=8.5 Hz, 2H), 6.91 (d, J=8.65 Hz, 2H).

N-lauroyl-2-methylalanine Sodium Salt: N-lauroyl-2-methylalanine was prepared using General Method for Acylation with 2-methylalanine as the amino acid, and Purification Method 2 (white solid, 0.77 g, 28%). The salt was prepared as described (white solid, 0.75 g, 28% over 2 steps). $^1$H NMR (400 MHz, CD$_3$OD) δ 0.93 (t, J=7.2 Hz, 3H), 1.25-1.40 (m, 16H), 1.53 (s, 6H), 1.62 (m, 2H), 2.19 (t, J=7.7 Hz, 2H).

N-lauroyl-DL-3-aminobutanoate Sodium Salt: N-lauroyl-DL-3-aminobutanoate was prepared using General Method for Acylation with 3-aminobutanoic acid as the amino acid, and Purification Method 2 (white solid, 1.81 g, 65%). The salt was prepared as described (white solid, 1.94 g, 65% over 2 steps). $^1$H NMR (400 MHz, D$_2$O) δ 0.87 (t, J=6.9 Hz, 3H), 1.17 (d, J=6.5 Hz, 3H), 1.24 (br s, 16H), 1.59 (m, 2H), 2.20 (t, J=7.5 Hz, 2H), 2.28 (dd, J=8.4 & 14.1 Hz, 1H), 2.47 (dd, J=5.9 & 14.1 Hz, 1H), 4.16 (m, 1H).

N-lauroyl-L-norvaline Sodium Salt: N-lauroyl-L-norvaline was prepared using General Method for Acylation with L-norvaline used as the amino acid, and Purification Method 2 (white solid, 2.08 g, 81%). The salt was prepared as described above (2.22 g, 81% over 2 steps). $^1$H NMR (400 MHz, D$_2$O) δ 0.87 (t, J=6.8 Hz, 3H), 0.92 (t, J=7.3 Hz, 3H), 1.21-1.44 (m, 18H), 1.52-1.71 (m, 3H), 1.78 (m, 1H), 2.23-2.37 (m, 2H), 4.19 (dd, J=4.2 & 9.2 Hz, 1H).

N-lauroyl-L-tert-leucine Sodium Salt: N-lauroyl-L-tert-leucine was prepared using General Method for Acylation with L-tert-leucine used as the amino acid, and Purification Method 1 (white solid, 1.39 g, 63%). The salt was prepared as described above (1.47 g, 63% over 2 steps). $^1$H NMR (400 MHz, CD$_3$OD) δ 0.92 (t, J=7.0 Hz, 3H), 1.02 (s, 9H), 1.24-1.43 (m, 16H), 1.58-1.72 (m, 2H), 2.20-2.35 (m, 2H), 4.23 (s, 1H).

N-lauroyl-L-phenylglycine Sodium Salt: N-lauroyl-L-phenylglycine was prepared using General Method for Acylation with L-phenylglycine used as the amino acid, and Purification Method 1 (white solid, 1.09 g, 50%). The salt was prepared as described above (1.13 g, 50% over 2 steps). $^1$H NMR (400 MHz, D$_2$O) δ 0.67 (t, J=7.1 Hz, 3H), 0.97-1.18 (m, 16H), 1.32-1.45 (m, 2H), 2.03-2.21 (m, 2H), 5.11-5.14 (m, 1H), 7.12-7.19 (m, 1H), 7.22 (t, J=7.9 Hz, 2H), 7.27 (d, J=7.5 Hz, 2H).

N-lauroyl-L-2-aminobutyrate Sodium Salt: N-lauroyl-L-2-aminobutyric acid was prepared using General Method for Acylation with -2-aminobutyric acid used as the amino acid, and Purification Method 2 (0.45 g, 16%). The salt was prepared as described above (0.46 g, 16% over 2 steps). $^1$H NMR (400 MHz, D$_2$O) δ 0.96 (t, J=7.1 Hz, 3H), 1.00 (t, J=7.6 Hz, 3H), 1.31-1.45 (m, 16H), 1.65-1.82 (m, 3H), 1.85-1.96 (m, 1H), 2.32-2.44 (m, 2H), 4.2 (dd, J=4.8 & 8.0 Hz, 1H).

N-lauroyl-4-methyl-L-leucine Sodium Salt: The acid was prepared as described in General Method for Acylation with L-β-t-butylalanine as the amino acid, and purified as described in Purification Method 1 to provide the product as a white solid (1.07 g, 47%). The sodium salt was prepared as described above and yielded 1.15 g (47% over 2 steps). $^1$H NMR (400 MHz, D$_2$O) δ 0.87 (t, J=7.1 Hz, 3H), 0.97 (s, 9H), 1.26 (m, 16H), 1.50-1.70 (m, 3H), 1.78 (dd, J=2.1 & 14.6 Hz, 1H), 2.20-2.36 (m, 2H), 4.24 (dd, J=2.2 & 10.0 Hz, 1H).

N-lauroyl-DL-3,3-diphenylalanine Sodium Salt: The acid was prepared as described in General Method for Acylation with DL-β-β-diphenylalanine as the amino acid, and purified as described in Purification Method 2 to provide the product as a white solid (0.66 g, 38%). The sodium salt was prepared as described above and yielded 0.42 g (23% over 2 steps). $^1$H NMR (400 MHz, D$_2$O) δ 0.81 (m, 2H), 0.89-1.08 (m, 7H), 1.09-1.39 (m, 12H), 1.97-2.13 (m, 2H), 4.54 (d, J=8.9 Hz, 1H), 5.20 (d, J=8.9 Hz, 1H), 7.00 (t, J=7.3 Hz, 1H), 7.10 (t, J=8.0 Hz, 2H), 7.15 (t, J=7.01, 1H), 7.23 (t, J=7.68 Hz, 2H), 7.27 (d, J=7.68 Hz, 2H), 7.36 (d, J=7.68 Hz, 2H).

N-lauroyl-DL-3-aminoisobutyrate Sodium Salt: The acid was prepared as described in General Method for Acylation with 3-aminoisobutyric acid as the amino acid, and purified as described in Purification Method 2 to provide the product as a white solid (2.33 g, 84%). The sodium salt was prepared as described above and yielded 1.67 g (56% over 2 steps). $^1$H NMR (400 MHz, D$_2$O) δ 0.87 (t, J=7.0 Hz, 3H), 1.09 (d, J=7.1 Hz, 3H), 1.22-1.33 (m, 16H), 1.59 (m, 2H), 2.23 (t, J=7.9 Hz, 2H), 2.45-2.55 (m, 2H), 3.20 (dd, J=7.9 & 13.4 Hz, 1H), 3.34 (dd, J=6.4 & 13.4 Hz, 1H).

Analytical Methods
Measuring the Potential for Compounds to Release Oil from Sand Particles:

In order to screen test compounds for the ability to release oil from nonporous silica medium, a microtiter plate assay was developed. The assay, referred to as the LOOS test (Less Oil On Sand), measures the ability of a test compound to release oil from oil-saturated sand by measuring sand released from an oil/sand mixture. Autoclaved sand obtained from the Schrader Bluff formation at the Milne Point Unit of the Alaskan North Slope was dried under vacuum at 160° C. for 48 hr. Twenty grams of the dried sand was then mixed with 5 mL of autoclaved, degassed crude oil obtained from an oil reservoir from either the Milne Point Unit of the Alaskan North Slope or from the Wainwright field in the province of Alberta, Canada. The oil-coated sand was then allowed to age anaerobically at room temperature, in an anaerobic chamber (Coy Laboratories Products, Inc., Grass Lake, Mich.; gas mixture: 5% hydrogen, 10% carbon dioxide and 85% nitrogen), for at least a week. Microtiter plate assays were set up and analyzed in an anaerobic chamber. Specifically, 2 mL of compound-containing test sample was added into each well of a 12-well microtiter plate (Falcon Multiwell 12 well plates, #353225, Becton Dickinson, Franklin Lakes, N.J.). Control wells contained 2 mL of sample medium alone. Approximately 40 mg of oil-coated sand was then added to the center of each well. Samples were monitored over time for release and accumulation of "free" sand that collected in the bottom of the wells. Approximate diameter (in millimeters) of the accumulated total sand released was measured for each sample. A score of 3 mm and above indicates the compound's potential to release oil from the nonporous silica medium.

Synthesis of N-acyl Alanine, Phenylalanine, or Valine Compounds

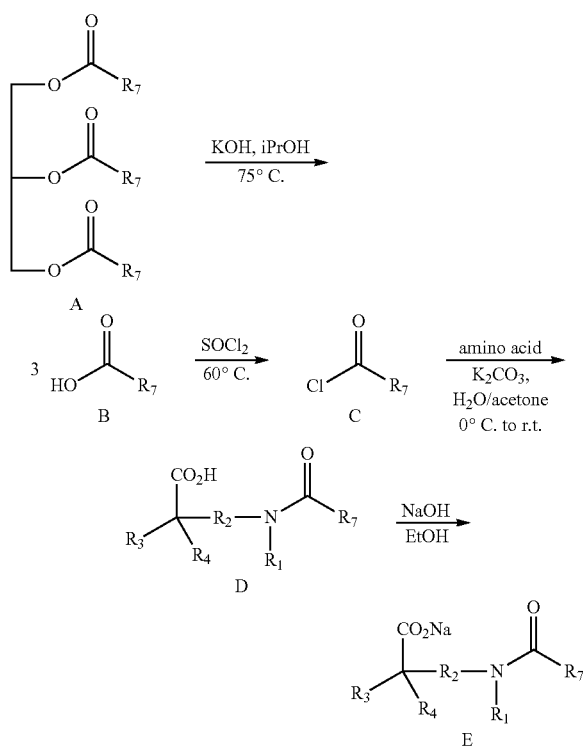

where $R_7$ represents saturated or unsaturated alkyl chains present in the oil sample provided. $R_7$ is a subset of $R_6$.

In each of A, B, C, D, and E the structure represents a mixture of different compounds that have different saturated or unsaturated alkyl chains as R.

Step 1: In a 250 mL round bottom flask, commodity soybean oil or high oleic soybean oil (1.5 g), containing triglycerides (A) with a mixture of alkyl chains (R) of the fatty acids listed in Tables 2 or 3 above, respectively, was combined with KOH (0.35 g), and i-PrOH (10 mL). The mixture was heated to 75° C. for 5 hours and then transferred to a beaker with 50 mL deionized water. The pH was adjusted to about 5.5 with 6 M HCl. The mixture became cloudy white. The product was extracted from the water layer with EtOAc (3×). The EtOAc was dried with $MgSO_4$ and the solvent was removed under vacuum to yield the long-chain fatty acid mixture (B) as a yellow oil.

Step 2: Excess thionyl chloride was added dropwise to dissolve the fatty acids (from step 1). The mixture was heated at 60° C. for 1 hour. Upon completion of the reaction, the excess thionyl chloride was removed under reduced pressure to yield the long-chain fatty acid chloride product mixture (C) as a brown oil. The acid chloride was immediately taken to the next step.

Step 3: The desired amino acid (1.0 equiv.) and $K_2CO_3$ (430 mg/mmol) were dissolved in water and cooled to 0° C. The acid chloride (from Step 2) was dissolved in acetone and added dropwise to the cooled amino acid solution. The reaction was allowed to warm up to r.t. over 1 h and stirred for an additional 2 h. Most of the acetone was removed under reduced pressure and the remaining solution was acidified to pH=1 with concentrated HCl. The aqueous layer was extracted with EtOAc (3×). The combined organic layers were washed with brine, dried with $MgSO_4$, and the solvent removed under reduced pressure to isolate the product (D).

Step 4: The acid from Step 3 was dissolved in ethanol. NaOH (1.0 equiv., dissolved in ethanol) was added and the reaction was allowed to stir at room temperature for an hour. The ethanol was removed under reduced pressure and the product was washed with hexanes (3×) to remove all the ethanol and provide the sodium salt (E).

$^1$H NMR Data

Sample 1; Mixture of N-acyl (high oleic*)-L-alanine: Prepared as described above from high oleic soybean oil and L-alanine. (400 MHz, MeOH-$d_4$) δ 0.93 (t, J=7.3 Hz), 1.27-1.42 (m), 1.59-1.69 (m), 2.20-2.12 (m), 2.24 (t, J=7.3 Hz), 4.27 (q, J=7.7 & 13.8 Hz), 5.37 (t, J=4.9 Hz). *where "high oleic" refers to alkyl chains of fatty acids from high oleic soybean oil Sample 2; Mixture of N-acyl (commodity)-L-alanine: Prepared as described above from commodity soybean oil and L-alanine. (400 MHz, $D_2O$) δ 0.83-0.92 (m), 1.17 (d, J=5.1 Hz), 1.20-1.41 (m), 1.59 (br s), 1.95-2.09 (m), 2.25 (t, J=6.1 Hz), 2.70-2.82 (m), 4.18 (q, J=7.8 & 14.7 Hz), 5.24-5.42 (m). *where "commodity" refers to alkyl chains of commodity soybean oil Sample 3; Mixture of N-acyl (high oleic)-L-phenylalanine: Prepared as described above from high oleic soybean oil and L-phenylalanine. (400 MHz, MeOH-$d_4$) δ 0.92 (t, J=7.0 Hz), 1.17-1.43 (m), 1.46-1.55 (m), 2.02-2.12 (m), 2.15 (t, J=7.7 Hz), 2.98 (dd, J=7.7 & 13.4 Hz), 3.25 (dd, J=5.1 & 12.8 Hz), 4.55 (q, J=4.5 & 8.3 Hz), 5.37 (t, J=5.7 Hz), 7.14-7.20 (m), 7.23 (s), 7.24 (s).

Sample 4; Mixture of N-acyl (high oleic)-L-valine: Prepared as described above from high oleic soybean oil and L-valine. (400 MHz, MeOH-d$_4$) δ 0.85-0.95 (m), 1.22-1.40 (m), 1.56-1.67 (m), 1.98-2.08 (m), 2.09-2.31 (m), 4.22 (d, J=5.1 Hz), 5.33 (t, J=5.1 Hz).

N-oleoyl-L-alanine: Prepared as described above in steps 2-4 using oleic acid and L-alanine. (400 MHz, MeOH-d$_4$) δ 0.92 (t, J=5.9 Hz, 3H), 1.27-1.41 (m, 23H), 1.58-1.67 (m, 2H), 2.05 (q, J=5.9 & 12.7 Hz, 4H), 2.23 (t, J=7.8 Hz, 2H), 4.24 (q, J=6.8 & 14.2 Hz, 1H), 5.36 (t, J=4.9 Hz, 2H).

Example 1

Measuring the Oil Releasing Potential of N-Lauroyl Amino Acid Derivatives

Oil releasing abilities of N-lauroyl-L-alanine (NLA) and other lauroyl amino acid derivatives, which were synthesized as described above in General Methods, were compared. Compounds were diluted to 1 mM and 10 mM in SIB (198 mM NaCl, 1 mM MgCl$_2$, 1.8 mM CaCl$_2$, 1.2 mM KCl, 16 mM NaHCO$_3$, 0.05 mM SrCl$_2$, 0.13 mM BaCl$_2$, 0.14 mM LiCl) and assayed in LOOS tests as described in General Methods. Controls were SIB alone. Salinity of SIB as measured by refractometry was 1.3%.

FIGS. 1-4 show the results of the experiments. As shown in FIG. 1, a solution of 10 mM NLA was able to release oil from sand, with the diameter of released sand reaching 8 mm after 2 days. Other lauroyl amino acid derivatives released oil as well or better than NLA. With N-lauroyl-L-phenylalanine at 10 mM, the sand diameter was 9 mm in 2 days. N-lauroyl-L-valine also released oil at the lower 1 mM concentration. There was no sand release (0 on a graph) for controls.

Figure 2:
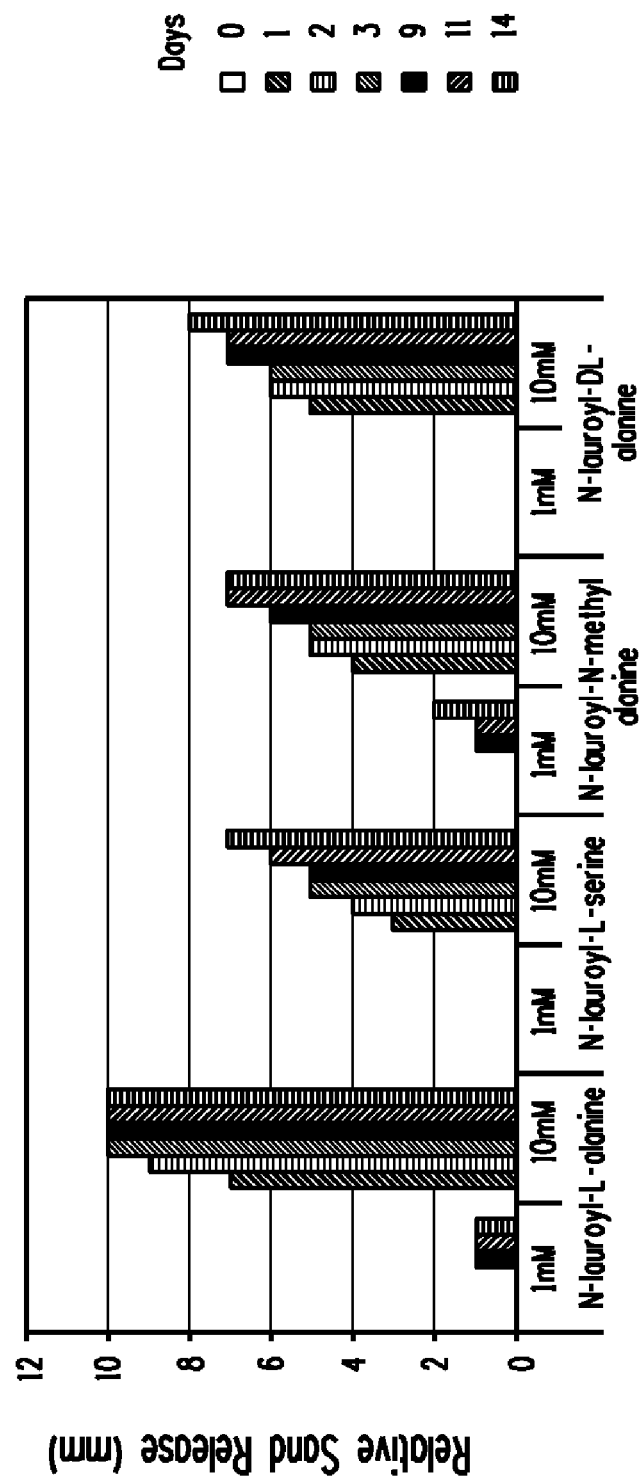
FIG. 2 shows a graph of oil release over time of a set of N-lauroyl amino acid compounds at 1 mM and 10 mM.

In another experiment shown in FIG. 2 NLA was active, with some activity at 1 mM concentration. N-lauroyl-L-serine, N-lauroyl-2-methylalanine and N-lauroyl-DL-alanine also had oil release activity at 10 mM concentration, with some activity of N-lauroyl-2-methylalanine at 1 mM.

Figure 3A:
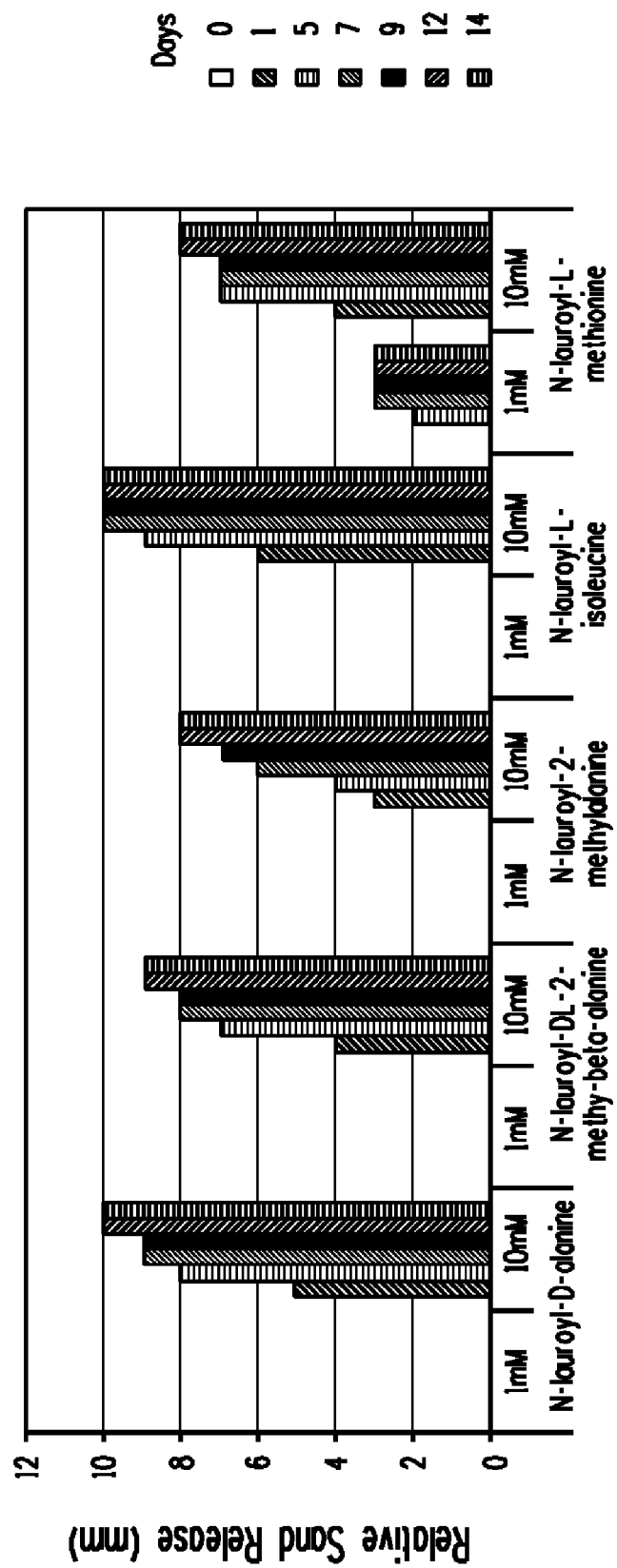
FIGS. 3A and 3B show graphs of oil release over time of a set of N-lauroyl amino acid compounds and derivatives at 1 mM and 10 mM.
Figure 3B:
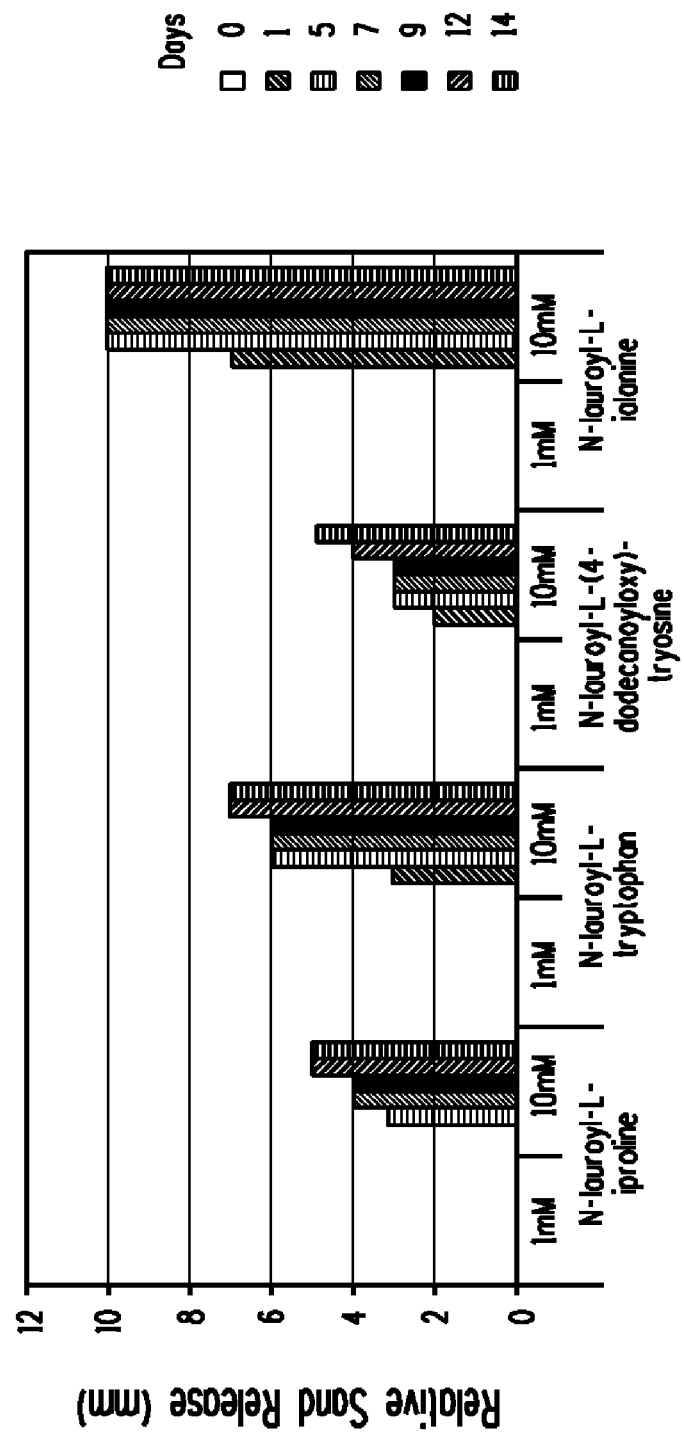

In another experiment shown in FIGS. 3A and B, the following additional compounds were found to be effective for oil release: N-lauroyl-D-alanine, N-lauroyl-DL-3-aminobutanoate, N-lauroyl-L-methionine, N-lauroyl-L-proline, N-lauroyl-L-tryptophan, and N-lauroyl-L-(4-dodecanoyloxy)-tyrosine. Repeat assays of NLA and N-lauroyl-2-methylalanine confirmed their activity.

Figure 4:
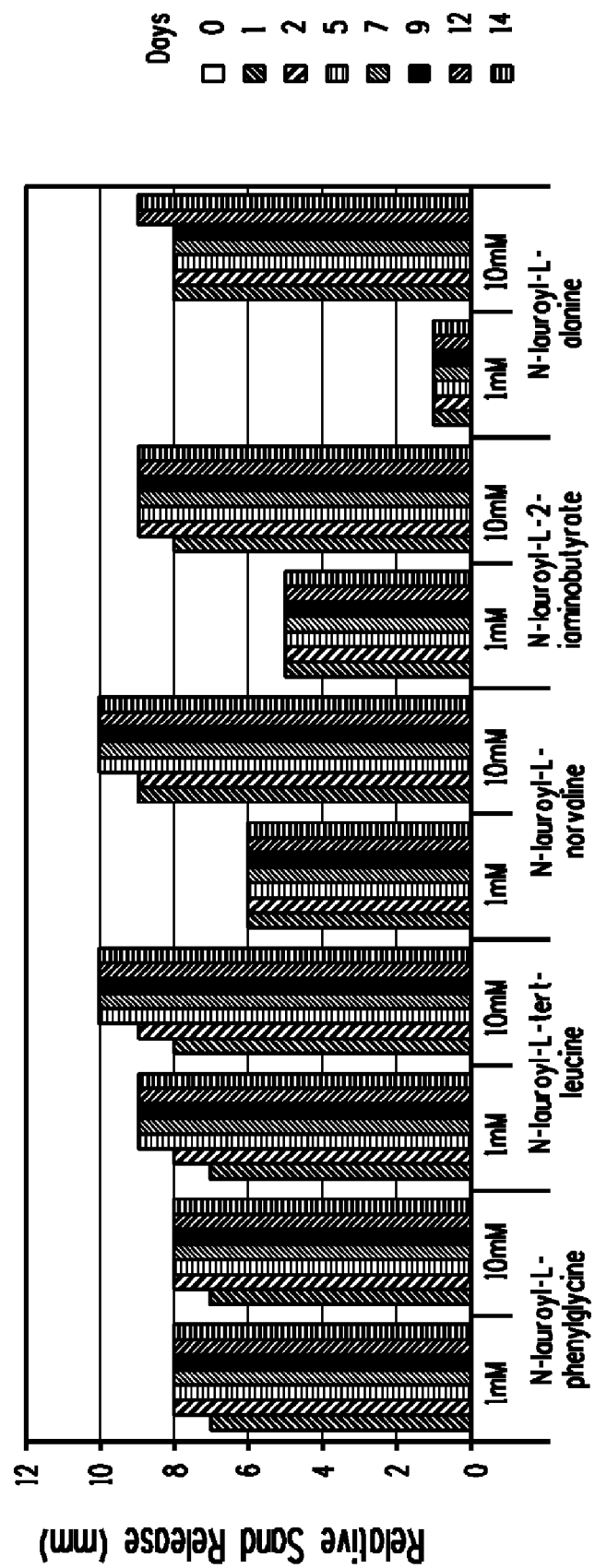
FIG. 4 shows a graph of oil release over time of a set of N-lauroyl amino acid compounds and derivatives at 1 mM and 10 mM.

In another experiment shown in FIG. 4, the following additional compounds were found to be effective for oil release: N-lauroyl-L-phenylglycine, N-lauroyl-L-tert-leucine, N-lauroyl-L-norvaline, and N-lauroyl-L-2-aminobutyrate. All four of these compounds also released oil at the lower 1 mM concentration. The activity of NLA was also repeated in this experiment.

In all assays where oil was released, no oil slick was visible on top of the solution. The sand was released and the oil formed balls, indicating that the sand became more water wet and less oil wet, without solubilization of the oil.

Example 2

Measuring the Oil Releasing Activities of N-Lauroyl Amino Acids in Higher Salt Concentrations The oil releasing abilities of NLA and some of the lauroyl amino acid derivatives were tested in the presence of high salts.

LOOS tests were performed as described in General Methods. NLA, N-lauroyl-L-valine, and N-lauroyl-L-phenylalanine were diluted to 10 mM in SIB. An additional salt was added to each of different test samples to bring the final concentration to 924 mM for NaCl, 7.4 mM for MgCl$_2$, or 10.9 mM for CaCl$_2$. A sample labeled "none" had no extra salts added but contained the levels already present in the SIB. An "All Salts" sample had all three salts added to the increased respective concentrations given above.

Figure 5:
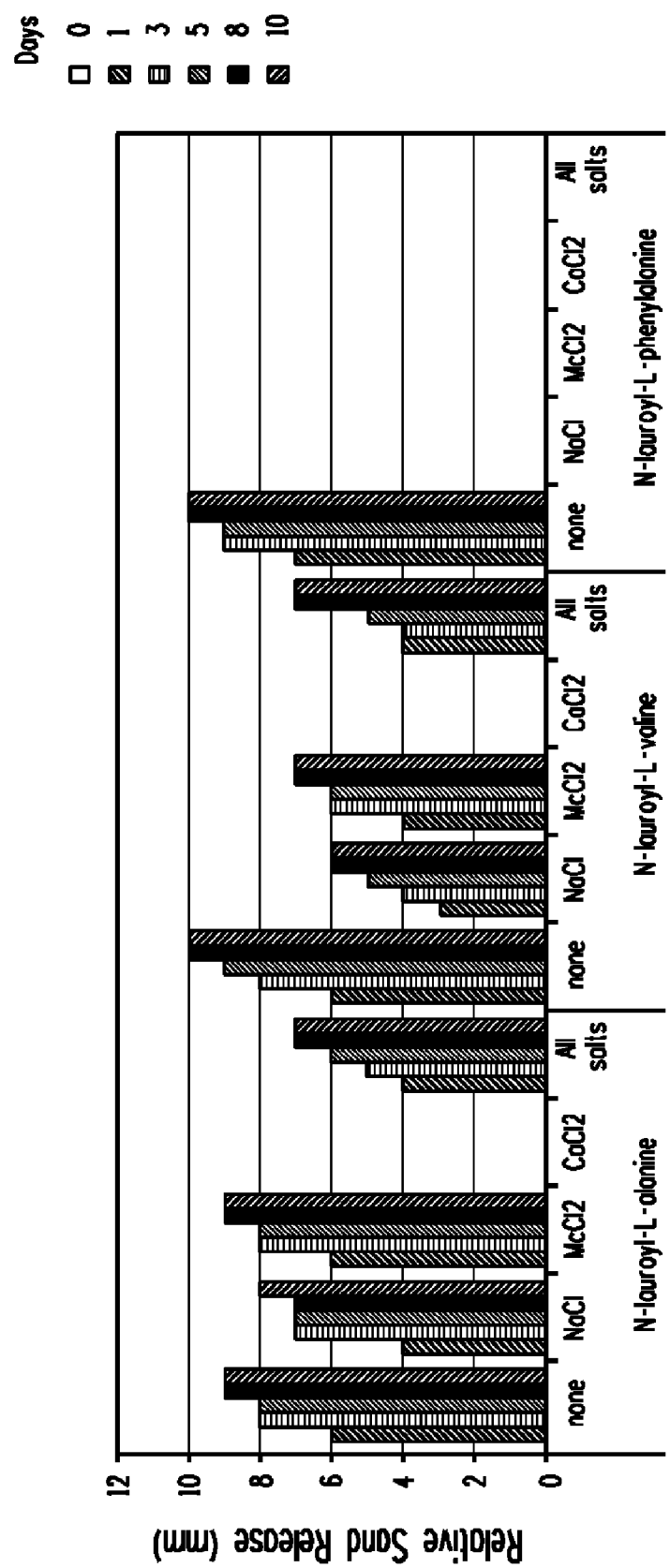
FIG. 5 shows a graph of oil release over time comparing a set of N-lauroyl amino acid compounds in the presence of high concentrations of monovalent and divalent cations.

The results given in FIG. 5 show that NLA and N-lauroyl-L-valine were able to release oil in the higher salts concentrations of NaCl and MgCl$_2$ as well as in the All Salts mixture, whereas N-lauroyl-L-phenylalanine did not.

Example 3

Measuring Oil Release from Sandpacks

Gravimetric Assay for Measuring Oil Release in a Sandpack Column

The potential application of NLA for enhanced oil recovery was evaluated using a gravimetric sandpack technique. This was done with an in-house developed Teflon® shrink-wrapped sandpack apparatus. Using a 0.5 inches (1.27 cm) OD and 7 inches (17.78 cm) long Teflon heat shrink tube (McMaster-Carr, Dayton N.J.), an aluminum inlet fitting with Viton® O-ring was attached to one end of the tube by heat with a heat gun. Sterile sand from Milne Point, Ak. was added to the column which was vibrated with an engraver to pack down the sand and release trapped air. A second aluminum inlet fitting with Viton® O-ring was attached to the other end of the tube and sealed with heat a gun. This sandpack was then put in an oven at 275° C. for 7 min to evenly heat and shrink the wrap. The sandpack was removed and allowed to cool to room temperature. A second Teflon® heat shrink tube was installed over the original sandpack and heated in the oven as described above. After the double-layer sandpack had cooled, a hose clamp was attached on the pack on the outer wrap over the O-ring and then tightened.

Figure 6:
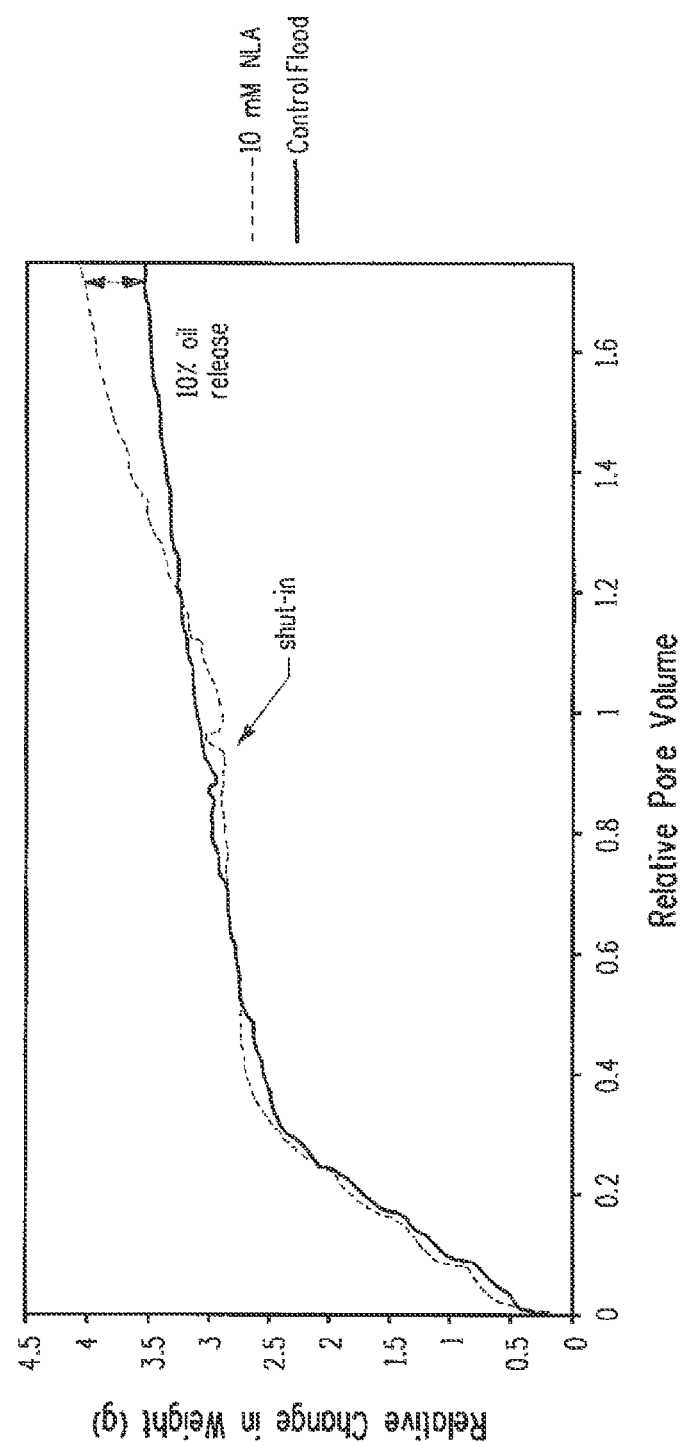
FIG. 6 shows a graph of weight change of a sandpack containing oil-coated sand with and without 10 mM of N-lauroyl-L-alanine loading, indicating oil release.

The sandpack was vertically mounted and secured onto a balance. Weight of the sandpack was continuously logged over time. The sandpack was flooded with four pore volumes (60 mL each) of filter sterilized injection water from the Wainwright oil field (Alberta, Canada) at 10 mL/hr via a syringe pump and a 60 mL (Becton Dickinson, Franklin Lakes, N.J.) sterile plastic polypropylene syringe. The sandpack was then flooded with two pore volumes of anaerobic autoclaved crude oil from the Wainwright oil field (Alberta, Canada) at 10 mL/hr to achieve irreducible water saturation. The crude oil was then aged on the sand for three weeks at room temperature. In order to determine a control de-oiling curve, approximately one pore volume (about 60 ml volume of fluid for each pore volume) of filter sterilized injection water was pumped onto the pack at 10 mL/hr, followed by a 5 day shut in period, then a second pore volume was loaded. The weight change of the saturated sand pack during this water flooding was monitored and is shown in FIG. 6 as the control flood. The column was then re-oiled with one pore volume of crude oil before loading with approximately one pore volume of 10 mM NLA in SIB at 10 mL/hr. The sandpack was then shut-in for five days. After the shut-in, the column was flooded with one pore volume of anaerobic sterile injection water at 10 mL/hr. Weight change was monitored during NLA solution loading and flooding after shut-in. As graphed in FIG. 6, the NLA sample showed a difference in weight, as compared to the control, after loading of about 1.8 pore volumes of approximately 0.5 g. Change in oil saturation is a function of change in the weight of the sandpack; the greater the weight, the less residual oil is present in the sand pack:

(change in weight of sandpack/pore volume)/(density of oil–density of water)

Thus a change in weight of 0.5 g (pore volume=60 mL, density of water=1.0 g/cm³, density of oil=0.93 g/cm³) translates to a reduction in residual oil saturation of approximately 10% indicating that the presence of NLA resulted in release of additional oil.

Example 4

Measurements of Interfacial Tension of NLA

Interfacial tension (IFT) between hexadecane and SIB containing NLA, or SIB alone, was measured by the inverted pendant drop method using a Model 500 goniometer with DROPimage Advanced software (Rame-Hart Instrument Co., Netcong, N.J.) following the supplier's protocol. NLA was diluted to 0.1% (3.4 mM) and 0.01% (0.34 mM) in SIB. Hexadecane was used as the organic drop phase. IFT was measured every 5 minutes for 15 minutes.

Figure 7:
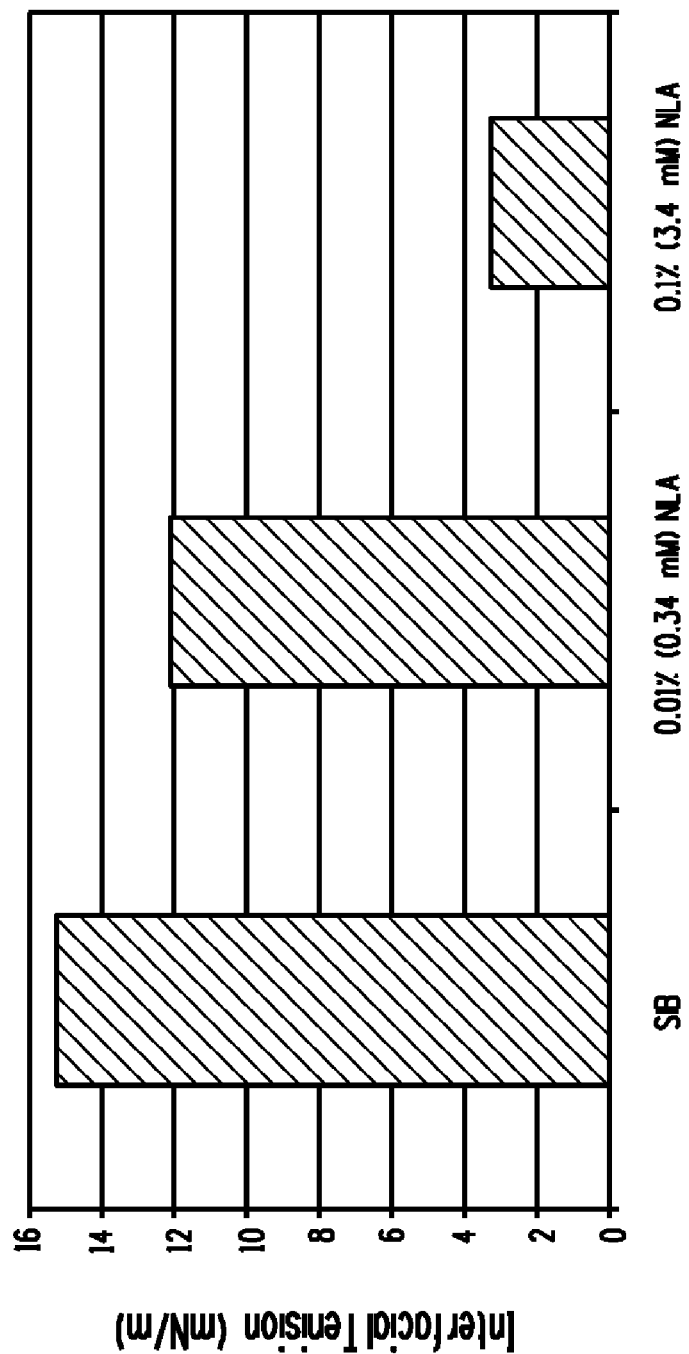
FIG. 7 shows a graph of interfacial tension measurements between hexadecane and N-lauroyl-alanine in SIB, compared to an SIB control.

FIG. 7 shows the IFT measured after 15 minutes for the two dilutions of NLA and the SIB alone. At the 0.1% concentration, the IFT decreased less than 5 fold as compared to the SIB media alone indicating that NLA has only a minimal effect on decreasing the interfacial tension between aqueous and hydrocarbon phases.

Example 5

Measurements of Surface Tension of N-Lauroyl Amino Acids

Surface tensions between a platinum plate and solutions of NLA, N-lauroyl-L-leucine, N-lauroyl-L-valine and N-lauroyl-L-phenylalanine were measured by the Wilhelmy plate method using a Kruss K11 tensiometer with a PL21 Pt-plate (Kruss, Hamburg, Germany) following the supplier's protocol. Samples were diluted into SIB to 0.01 mM, 0.1 mM, 1.0 mM, 10.0 mM, and 100.0 mM concentrations for the measurements.

Figure 8:
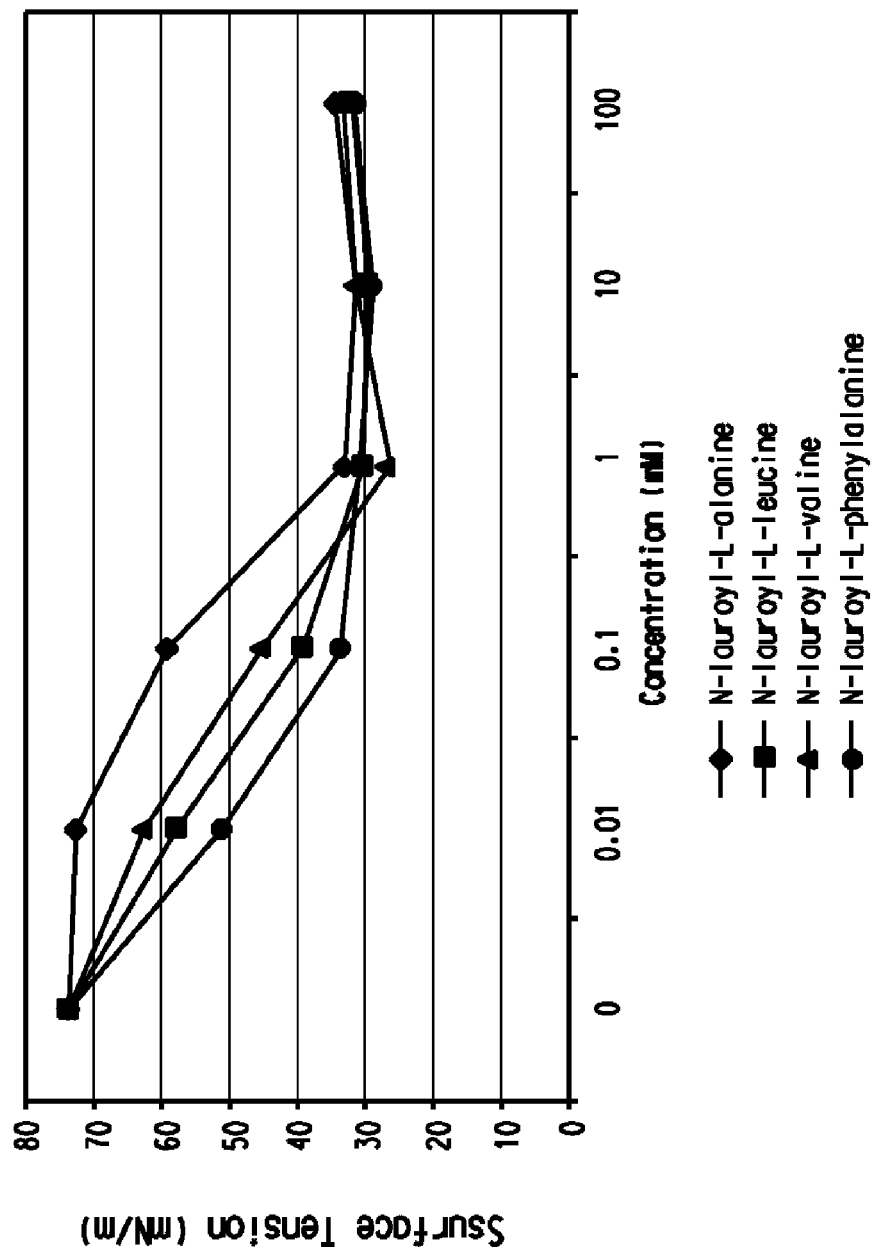
FIG. 8 shows a graph of surface tension measurements between a platinum plate and dilutions of N-lauroyl amino acid compounds in SIB.

The results are shown in FIG. 8. Surface tensions decreased to approximately 30 mN/m for all four compounds tested, with NLA dropping at the slowest rate and N-lauroyl-L-phenylalanine at the fastest rate. These results showed that the CMC of these compounds is in the range of about 0.1 to 10 mM, with the CMC for N-lauroyl-L-phenylalanine being slightly lower than for NLA.

Example 6

Measuring the Oil Releasing Potential of Additional N-Lauroyl Amino Acid Derivatives Oil releasing abilities of additional lauroyl amino acid derivatives, which were synthesized as described above in General Methods, were compared as described in Example 1.

Figure 9:
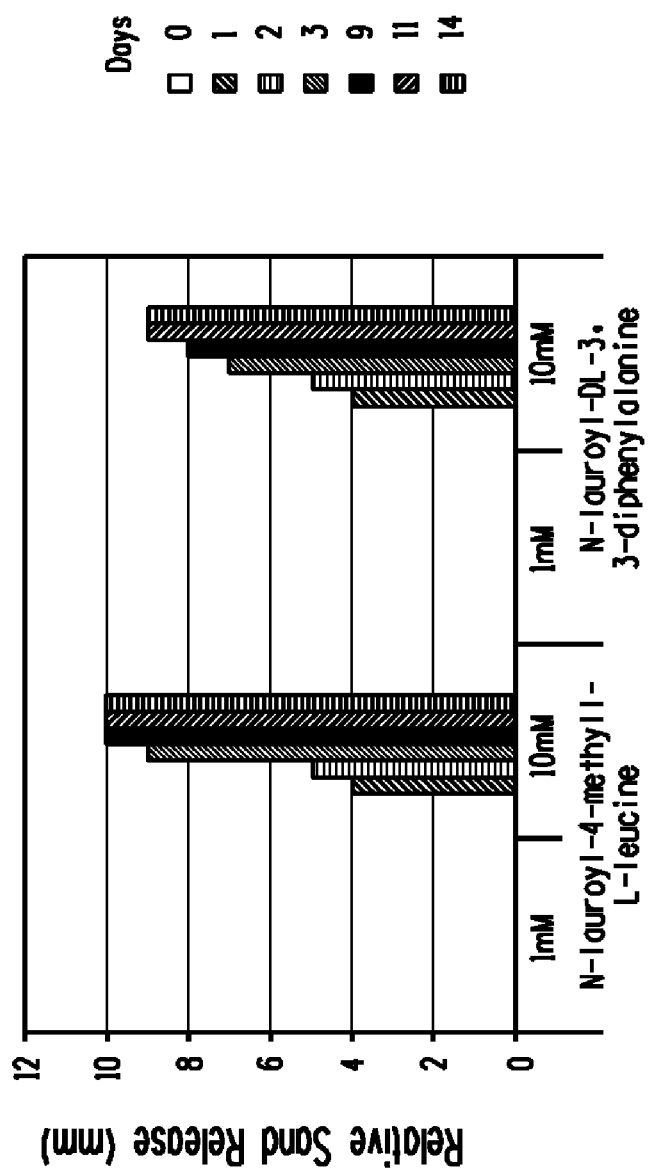
FIG. 9 shows a graph of oil release over time of N-lauroyl-4-methyl I-L-leucine and N-lauroyl-DL-3,3-diphenylalanine at 1 mM and 10 mM.

The following additional compounds were found to be effective for oil release at the 10 mM concentration: N-lauroyl-4-methyl-L-leucine and N-lauroyl-DL-3,3-diphenylalanine, as shown in FIG. 9.

Figure 10:
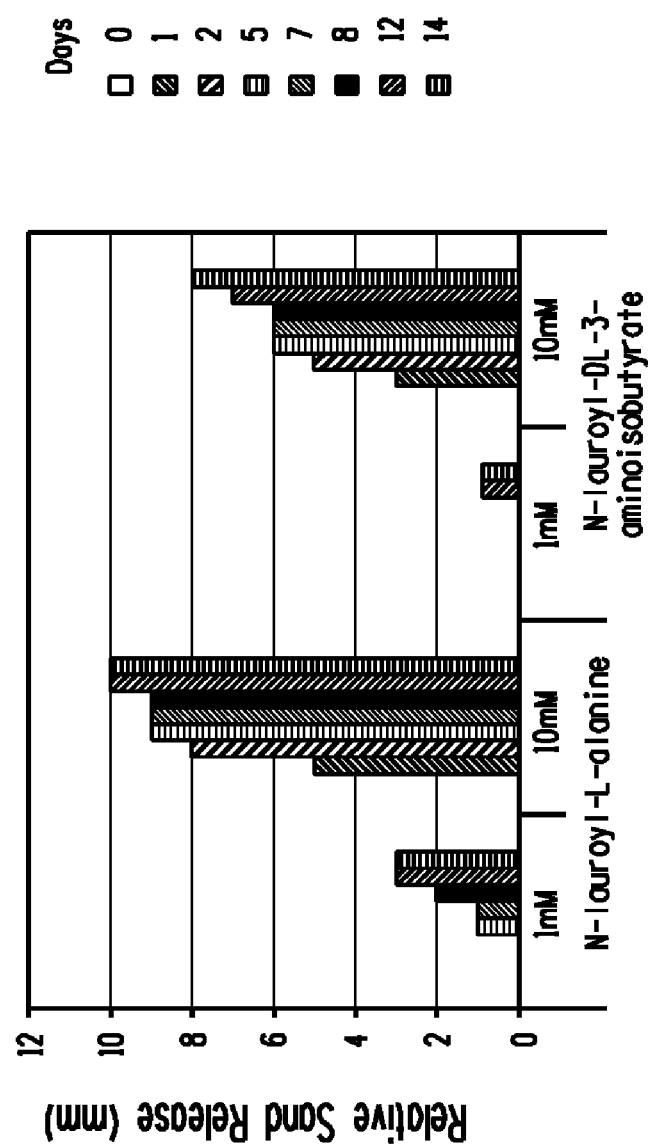
FIG. 10 shows a graph of oil release over time of N-lauroyl-L-alanine and N-lauroyl-DL-3-aminoisobutyrate at 1 mM and 10 mM.

In another experiment shown in FIG. 10, NLA was active and an additional compound, N-lauroyl-DL-3-aminoisobutyrate, was also found to be effective for oil release at the 10 mM concentration.

Example 7

Measuring Oil Releasing Activities of N-Acyl Amino Acid Compounds

The oil releasing abilities of N-lauroyl-L-alanine (NLA) and other N-acyl amino acid compounds, based on alanine, valine, or phenylalanine and having alkyl chains derived from high oleic soybean oil or from commodity soybean oil, that were synthesized as described above were tested. Compounds were diluted to 1 mM and 10 mM in SIB medium (198 mM NaCl, 1 mM $MgCl_2$, 1.8 mM $CaCl_2$, 1.2 mM KCl, 16 mM $NaHCO_3$, 0.05 mM $SrCl_2$, 0.13 mM $BaCl_2$, 0.14 mM LiCl). LOOS tests were performed as described in General Methods.

Figure 11:
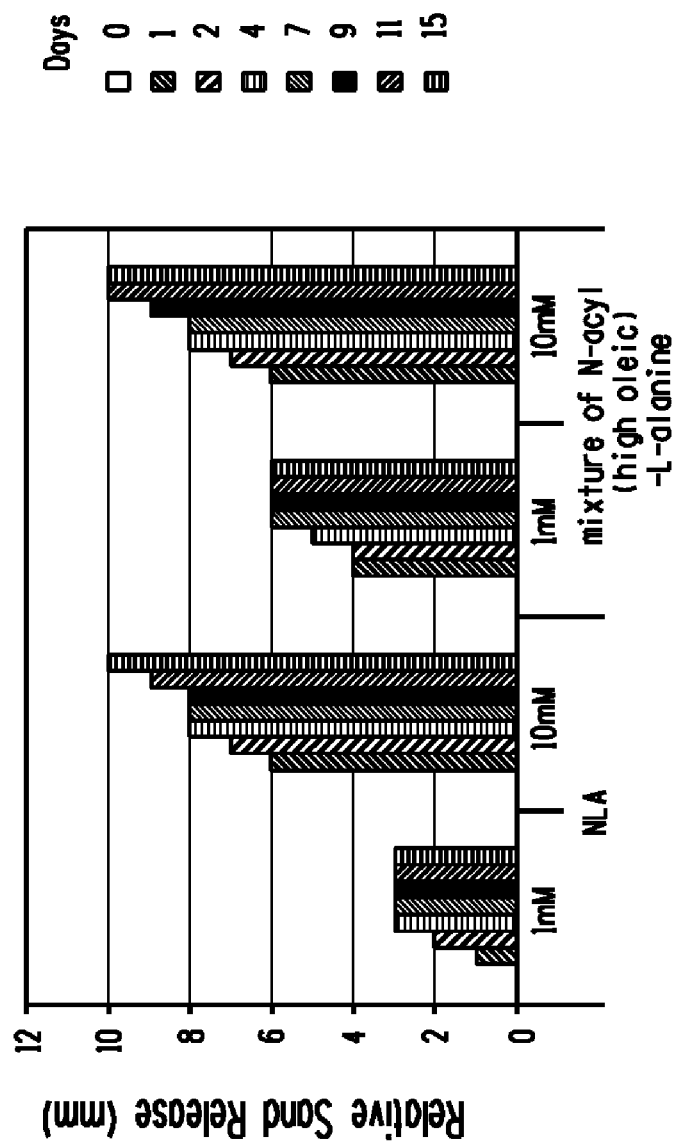
FIG. 11 shows a graph of oil release over time of N-lauroyl-L-alanine and Sample 1 mixture of N-acyl (high oleic)-L-alanine compounds at 1 mM and 10 mM, where "high oleic" refers to alkyl chains of fatty acids from high oleic soybean oil.
Figure 12:
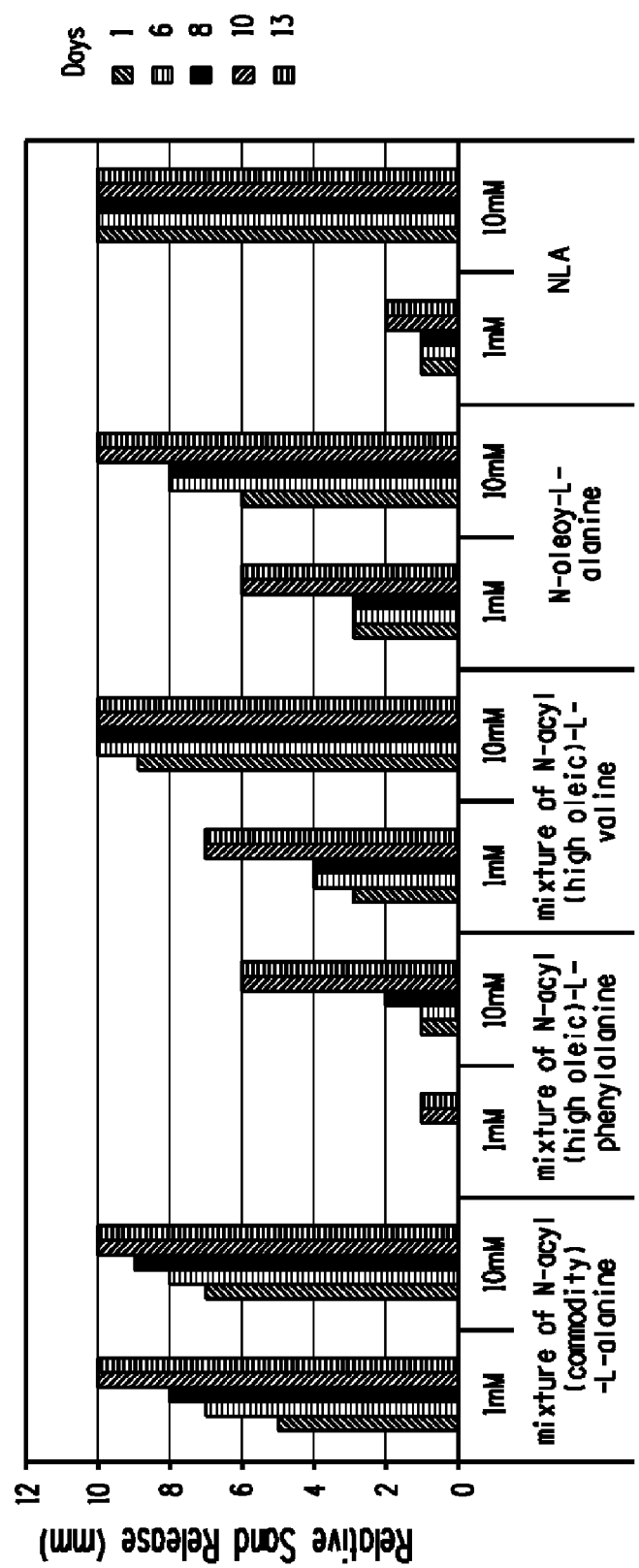
FIG. 12 shows a graph of oil release over time of Sample 2 mixture of N-acyl (commodity)-L-alanine, Sample 3 mixture of N-acyl (high oleic)-L-phenylalanine, Sample 4 mixture of N-acyl (high oleic)-L-valine, N-oleoyl-L-alanine and NLA compounds at 1 mM and 10 mM, where "high oleic" refers to alkyl chains of fatty acids from high oleic soybean oil and where "commodity" refers to alkyl chains of commodity soybean oil.

FIGS. 11 and 12 show the results of the experiments. As shown in FIG. 11, NLA was active and the Sample 1 containing a mixture of N-acyl alanine having alkyl chains derived from high oleic soybean oil was also found to be effective for oil release at the 1 mM and 10 mM concentrations. As shown in FIG. 12, NLA and the Sample 2 mixture of N-acyl (commodity)-L-alanine, Sample 3 mixture of N-acyl (high oleic)-L-phenylalanine, Sample 4 mixture of N-acyl (high oleic)-L-valine, and N-oleoyl-L-alanine were all found to be effective for oil release.

Example 8

Measuring Oil Releasing Activity of N-Acyl Amino Acid Compounds in High Salts Media The oil releasing abilities of Sample 2 mixture of N-acyl (commodity)-L-alanine, Sample 3 mixture of N-acyl (high oleic)-L-phenylalanine, Sample 4 mixture of N-acyl (high oleic)-L-valine, and N-oleoyl-L-alanine were tested in high salts media. Compounds were diluted to 10 mM in SIB (SIB), SIB with $CaCl_2$ added to a final concentration of 10.9 mM (SIB+$CaCl_2$), or SIB with NaCl, $MgCl_2$, and $CaCl_2$ added to final concentrations of 924 mM, 7.4 mM 10.9 mM, respectively (SIB+all). LOOS tests were performed as described in General Methods.

Figure 13:
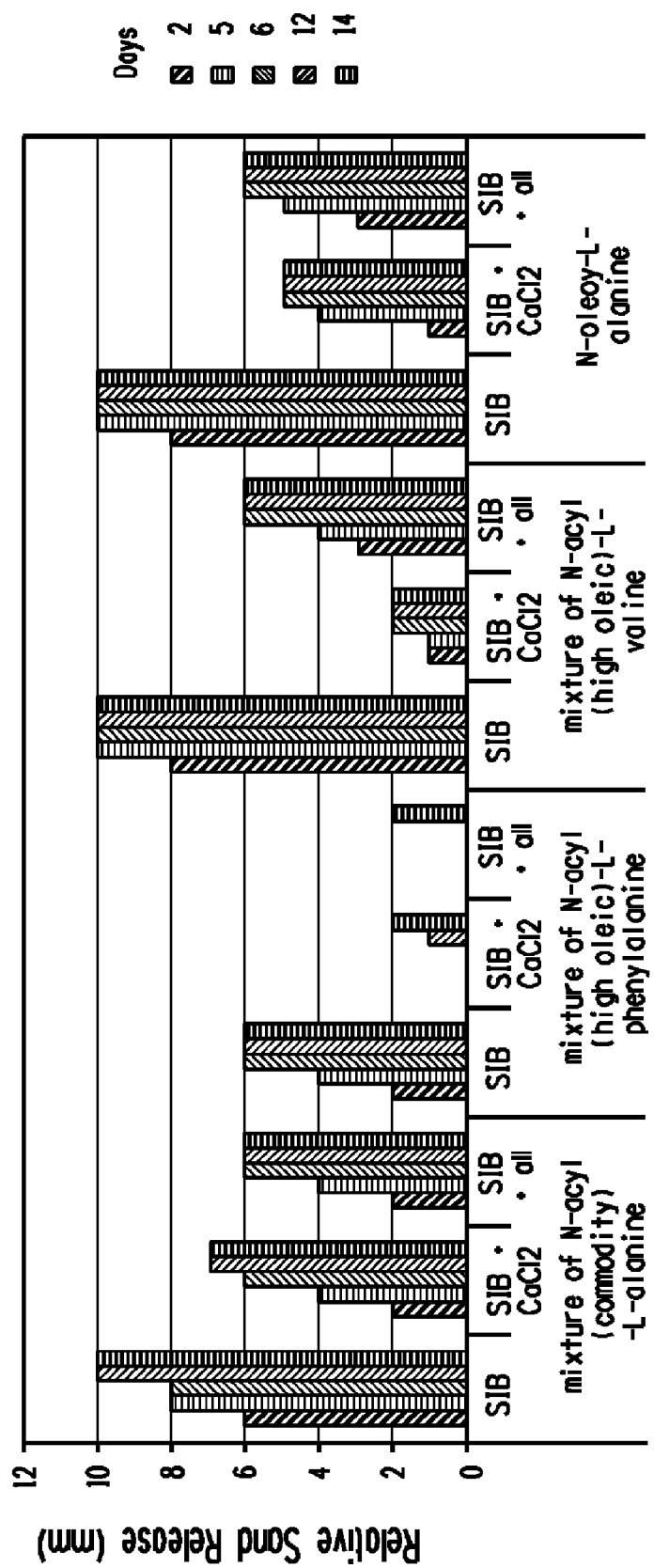
FIG. 13 shows a graph of oil release over time in SIB and high salts media of Sample 2 mixture of N-acyl (commodity)-L-alanine, Sample 3 mixture of N-acyl (high oleic)-L-phenylalanine, Sample 4 mixture of N-acyl (high oleic)-L-valine, and N-oleoyl-L-alanine at 10 mM, where "high oleic" refers to alkyl chains of fatty acids from high oleic soybean oil and where "commodity" refers to alkyl chains of commodity soybean oil.

The results given in FIG. 13 show that Samples 2 and 4, as well as N-oleoyl-L-alanine were able to release oil in both of the high salts media. Sample 3 released oil in SIB medium.

What is claimed is:

1. A method for improving oil recovery from an oil-coated surface comprising:
   a) providing an aqueous composition comprising at least one compound of the structure:

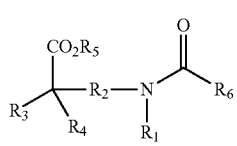

(XXIV)

where:
$R_1$ is H, $CH_3$, or is part of a heterocyclic ring (—$CH_2$—)$_n$, where n=3, 4, or 5 and the ring is directly connected to the rest of the structure at $R_4$;
$R_2$ is an alkyl group (—$CH_2$—)$_n$ where n=0 or 1; or (—$CHCH_3$—)$_n$, where n=1;
$R_3$ and $R_4$ are independently H, a straight chain alkyl or branched-chain alkyl group with 1 to 5 carbons, —CH$_2$OH, —CH$_2$CH$_2$SCH$_3$, a cycloalkyl group, a substituted cycloalkyl group, an aryl group, an alkylaryl group; a substituted aryl group; a phenyl group, —CH$_2$Ph (Ph is phenyl), —CH(Ph)Ph; a heterocycle; a substituted heterocycle; or is part of a heterocyclic ring (—CH$_2$—)$_n$, where n=3, 4, or 5 and is directly connected to the rest of the structure at R$_1$;

R$_5$ is a monovalent cation or H; and

R$_6$ is a saturated alkyl chain —(CH$_2$)$_n$CH$_3$, where n is equal to or between the integers of 11 and 22, or R$_6$ is a monounsaturated alkyl chain or polyunsaturated alkyl chain containing the number of carbons equal to or between the integers of 11 and 23 and containing 1, 2 or 3 units of unsaturation; and b) providing one or more microorganisms which grow in the presence of oil and an electron acceptor;

c) providing a minimal growth medium comprising a carbon source and an electron acceptor;

d) contacting an oil-coated surface with the composition of (c);

e) releasing the oil from said oil-coated surface to provide a released oil; and f) recovering the released oil.

2. The method of claim 1, wherein R$_3$ is H or CH$_3$.

3. The method of claim 1, wherein R$_3$ and R$_4$ are both uncharged.

4. The method of claim 1, wherein R$_5$ is an alkali metal cation.

5. The method of claim 4, wherein the alkali metal cation is Na$^+$ or K$^+$.

6. The method of claim 1, wherein the composition comprises a mixture of compounds of structure (XXIV).

7. The method of claim 6, wherein the compounds of structure (XXIV) in the mixture vary in the type of alkyl chain in the compound.

8. The method of claim 1, wherein the aqueous composition comprises injection water.

9. The method of claim 1, wherein the oil-coated surface is in a subsurface or surface formation.

10. The method of claim 8, wherein the subsurface formation is an oil reservoir.

11. The method of claim 1, wherein the oil-coated surface is selected from the group consisting of rock, soil, sand, shale, clay, sediment, sludge, harbor dredge spoils, refinery waste, and mixtures thereof.

12. The method of claim 1, wherein the oil-coated surface is selected from the group consisting of a pipeline, oil tank, oil tanker, and oil handling equipment.

13. The method of claim 1, wherein the microorganism belongs to a genus that is selected from the group consisting of *Pseudomonas, Bacillus, Actinomycetes, Acinetobacter, Arthrobacter, Schizomycetes, Corynebacteria, Achromobacteria, Enterobacteria, Nocardia, Saccharomycetes, Schizosaccharomyces, Vibrio, Shewanella, Arcobacter, Thauera, Petrotoga, Microbulbifer, Klebsiella, Marinobacteria, Fusibacteria* and *Rhodotorula*.

14. The method of claim 13, wherein the microorganism is selected from the group consisting of *Pseudomonas stutzeri*, a *Thauera* species, a *Shewanella* species, and an *Arcobacter* species of Clade 1.

* * * * *

UNITED STATES PATENT AND TRADEMARK OFFICE
CERTIFICATE OF CORRECTION

| | | |
|---|---|---|
| PATENT NO. | : 8,940,665 B2 | Page 1 of 1 |
| APPLICATION NO. | : 13/433745 | |
| DATED | : January 27, 2015 | |
| INVENTOR(S) | : Michael P Perry et al. | |

It is certified that error appears in the above-identified patent and that said Letters Patent is hereby corrected as shown below:

In the Claims

Col. 30, line 10, claim dependency "8" should read --9--.

Signed and Sealed this
Fourteenth Day of July, 2015

Michelle K. Lee
*Director of the United States Patent and Trademark Office*